(12) United States Patent
Lee

(10) Patent No.: US 11,340,802 B2
(45) Date of Patent: May 24, 2022

(54) SEMICONDUCTOR MEMORY DEVICE, CONTROLLER, MEMORY SYSTEM AND METHOD THEREOF

(71) Applicant: SK hynix Inc., Gyeonggi-do (KR)

(72) Inventor: Hyo Jae Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/984,949

(22) Filed: Aug. 4, 2020

(65) Prior Publication Data
US 2021/0294503 A1    Sep. 23, 2021

(30) Foreign Application Priority Data

Mar. 19, 2020    (KR) .......................... 10-2020-0034029

(51) Int. Cl.
*G06F 3/06*    (2006.01)

(52) U.S. Cl.
CPC .......... *G06F 3/0625* (2013.01); *G06F 3/0619* (2013.01); *G06F 3/0653* (2013.01); *G06F 3/0655* (2013.01); *G06F 3/0659* (2013.01); *G06F 3/0679* (2013.01)

(58) Field of Classification Search
CPC .... G06F 3/0619; G06F 3/0625; G06F 3/0655; G06F 3/0679–0688; G06F 1/30; G06F 2212/1032; G06F 3/0653; G06F 3/0614; G06F 3/0646; G06F 3/0656; G06F 3/0659; G06F 1/24; G06F 1/28; G11C 16/08; G11C 16/10
See application file for complete search history.

(56) References Cited

U.S. PATENT DOCUMENTS

| 2005/0099857 A1* | 5/2005 | Yuan ..................... G11C 7/1027 365/200 |
| 2015/0106557 A1* | 4/2015 | Yu ........................ G11C 11/5678 711/103 |
| 2016/0011779 A1* | 1/2016 | Lee ....................... G06F 3/0688 711/103 |
| 2018/0349240 A1* | 12/2018 | Ji ........................ G06F 11/2094 |

FOREIGN PATENT DOCUMENTS

| KR | 10-2015-0026248 | 3/2015 |
| KR | 10-2018-0027035 | 3/2018 |
| KR | 10-2019-0098688 | 8/2019 |

* cited by examiner

*Primary Examiner* — Reginald G Bragdon
*Assistant Examiner* — Curtis James Kortman
(74) *Attorney, Agent, or Firm* — IP & T Group LLP

(57) ABSTRACT

A memory system includes a semiconductor memory device and a controller. The semiconductor memory device includes a plurality of planes and performs a protection operation and a general operation on the plurality of planes. The controller controls an operation of the semiconductor memory device by transferring a Sudden Power Off (SPO) process command, which is generated in response to a Sudden Power Off (SPO) that occurs in the memory system, to the semiconductor memory device. The semiconductor memory device is configured to interrupt the general operations among operations performed on the plurality of planes in response to the SPO process command.

24 Claims, 17 Drawing Sheets

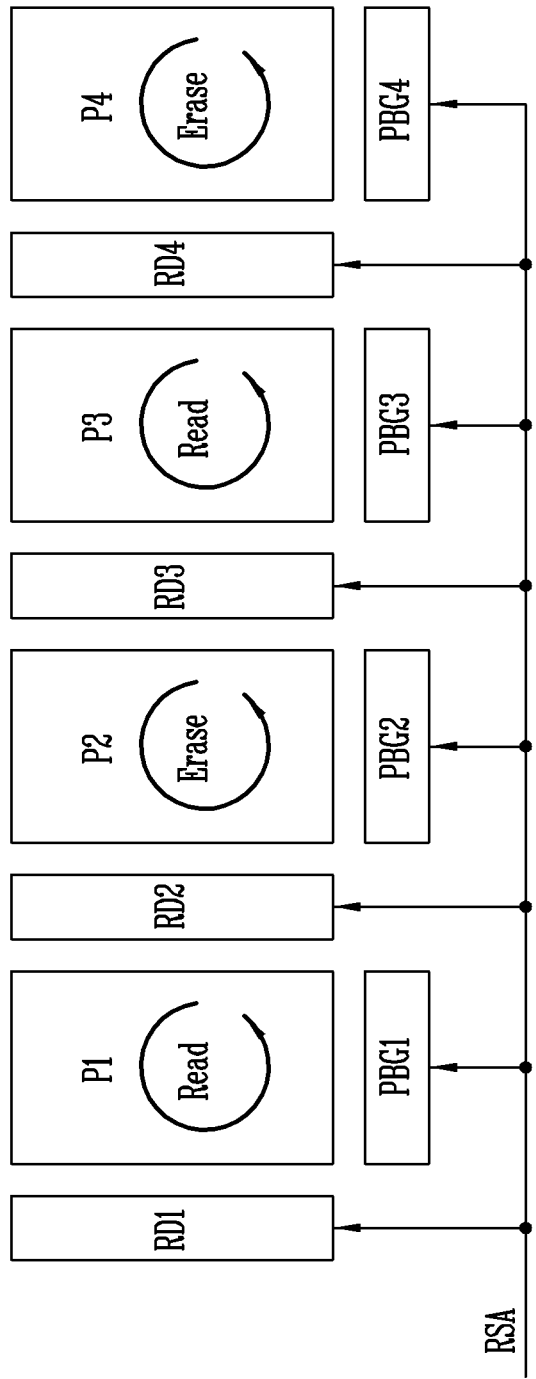

SEMICONDUCTOR MEMORY DEVICE, CONTROLLER, MEMORY SYSTEM AND METHOD THEREOF

CROSS-REFERENCE TO RELATED APPLICATION

The present application claims priority under 35 U.S.C. § 119(a) to Korean patent application number 10-2020-0034029 filed on Mar. 19, 2020 with the Korean Intellectual Property Office, and which is incorporated herein by reference in its entirety.

BACKGROUND

Field of Invention

Various embodiments of the present disclosure generally relate to an electronic device and, more particularly, to a semiconductor memory device, a controller, and a memory system having the semiconductor memory device and the controller.

Description of Related Art

A semiconductor memory device can be designed and manufactured to have a two-dimensional structure, in which strings are arranged in a horizontal direction parallel to a semiconductor substrate, or a three-dimensional structure, in which strings are arranged in a vertical direction to the semiconductor substrate. A three-dimensional memory device is devised to overcome integration limits of a two-dimensional memory device and may include a plurality of memory cells vertically stacked on a semiconductor substrate.

SUMMARY

Various embodiments of the present disclosure provide a semiconductor memory device and a controller with improved stability, and a memory system having the semiconductor memory device and the controller.

Various embodiments of the present disclosure provide a method of operating a semiconductor memory device and a controller with improved stability, and a memory system having the semiconductor memory device and the controller.

According to an embodiment of the present disclosure, a memory system may include a semiconductor memory device and a controller. The semiconductor memory device may include a plurality of planes, the semiconductor device being configured to perform a protection operation and a general operation on the plurality of planes. The controller may control an operation of the semiconductor memory device by transferring a Sudden Power Off (SPO) process command, which is generated in response to a Sudden Power Off (SPO) that occurs in the memory system, to the semiconductor memory device. The semiconductor memory device may be configured to interrupt the general operation among operations performed on the plurality of planes in response to the SPO process command.

According to an embodiment, the protection operation may include a program operation.

According to an embodiment, the general operation may include one of an erase operation and a read operation.

According to an embodiment, the protection operation may include a Single-Level Cell (SLC) program operation.

According to an embodiment, the general operation may include one of an erase operation, a read operation, a Multi-Level Cell (MLC) program operation, a Triple-Level Cell (TLC) program operation, and a Quadruple-Level Cell (QLC) program operation.

According to an embodiment, the semiconductor memory device may interrupt the general operation by identifying a plane performing the general operation among the plurality of planes in response to the SPO process command. The semiconductor memory device may generate an internal control signal for interrupting an operation of the identified plane.

According to another embodiment of the present disclosure, a semiconductor memory device operating under the control of a controller may include a plurality of planes, a plurality of row decoders coupled to the plurality of planes through row lines, a plurality of page buffer groups coupled to the plurality of planes through bit lines, and a control logic controlling the plurality of row decoders and the plurality of page buffer groups to perform a protection operation and a general operation on the plurality of planes. The control logic may be configured to control the plurality of row decoders and the plurality of page buffer groups to interrupt the general operation among operations performed on the plurality of planes in response to an SPO process command received from the controller.

According to an embodiment, the control logic may include a command decoder, a plane operation state storage, and a control signal generator. The command decoder may decode the SPO process command and generate a command decoding signal which indicates that an operation on a plane performing the general operation should be interrupted. The plane operation state storage may store a current operation state each of the plurality of planes. The control signal generator may identify a plane which performs the general operation based on the current operation state of the each of the plurality of planes and the command decoding signal, and generate an internal control signal for interrupting an operation of the identified plane.

According to an embodiment, the control signal generator may include a plane reset determiner and an individual plane reset controller. The plane reset determiner may generate identification information on the plane which performs the general operation by receiving information indicating the current operation state of the each of the plurality of planes. The individual plane reset controller may generate the internal control signal for interrupting the operation of the identified plane based on the identification information for the plane which performs the general operation.

According to an embodiment, the control signal generator may include a plane reset determiner, an entire plane reset controller, and an individual plane reset controller. The plane reset determiner may generate a reset enable signal if a plane which performs the protection operation does not exist among the plurality of planes and generate identification information of the plane which performs the general operation if a plane which performs the protection operation exists among the plurality of planes, by receiving information indicating the current operation state for each of the plurality of planes. The entire plane reset controller may generate a first control signal for interrupting all operations of the plurality of planes in response to the reset enable signal. The individual plane reset controller may generate a second control signal for interrupting the operation of the identified plane based on the identification information of the plane which performs the general operation.

According to another embodiment of the present disclosure, a method of operating a controller which controls an operation of a semiconductor memory device may be provided. According to the operating method, a sudden power off (SPO) in a memory system including the semiconductor memory device and the controller may be sensed, an operation state of the semiconductor memory device may be sensed, and an SPO process command, which indicates that the SPO occurred, may be generated and transferred to the semiconductor memory device based on the operation state.

According to an embodiment, the step in which an SPO process command is generated and transferred is performed in response to the semiconductor memory device being in a busy state.

According to another embodiment of the present disclosure, a method of operating a semiconductor memory device which performs a general operation and a protection operation on a plurality of planes may be provided. According to the operating method, a sudden power off (SPO) process command may be received, one of the plurality of planes may be selected, and it may be determined whether to interrupt an operation of the selected plane based on an operation state of the selected plane.

According to an embodiment, the step in which whether to interrupt an operation of the selected plane is determined may include a step in which it is detected the protection operation performed by the selected plane, and a step in which it is determined not to interrupt the protection operation of the selected plane.

According to an embodiment, the step in which whether to interrupt an operation of the selected plane is determined may include a step in which it is detected the general operation performed by the selected plane, and a step in which it is determined to interrupt the general operation of the selected plane.

According to an embodiment, the method of operating the semiconductor memory device may further include a step in which an internal control signal for interrupting the general operation of the selected plane is generated.

According to an embodiment, the protection operation may include a program operation.

According to an embodiment, the general operation may include one of an erase operation and a read operation.

According to an embodiment, the protection operation may include a Single-Level Cell (SLC) program operation.

According to an embodiment, the general operation may include one of an erase operation, a read operation, a Multi-Level Cell (MLC) program operation, a Triple-Level Cell (TLC) program operation, and a Quadruple-Level Cell (QLC) program operation.

According to another embodiment of the present disclosure, a method of operating a semiconductor memory device which performs a general operation and a protection operation on a plurality of planes may be provided. According to the operating method, a sudden power off (SPO) process command may be received, it may be determined whether a plane which performs the protection operation exists among the plurality of planes, and an operation of at least one plane among the plurality of planes may be interrupted based on a determination result.

According to an embodiment, the interrupting includes interrupting all operations of the plurality of planes in response to the plurality of planes performing the general operation.

According to an embodiment, when the plane which performs the protection operation is determined to exist among the plurality of plane, the interrupting may include a step in which one of the plurality of planes is selected and a step in which it is determined whether to interrupt an operation of the selected plane based on an operation state of the selected plane.

According to an embodiment, the step in which it is determined whether to interrupt the operation of the selected plane based on the operation state of the selected plane may include a step in which it is detecting the protection operation performed by the selected plane and a step in which it is determined not to interrupt the protection operation of the selected plane.

According to an embodiment, the step in which it is determined whether to interrupt the operation of the selected plane based on the operation state of the selected plane may include a step in which it is detected the general operation performed by the selected plane and a step in which it is determined to interrupt the general operation of the selected plane.

According to an embodiment, the method of operating the semiconductor memory device may further include a step in which an internal control signal for interrupting the general operation of the selected plane is generated.

According to an embodiment, the protection operation may include a program operation.

According to an embodiment, the general operation may include one of an erase operation and a read operation.

According to an embodiment, the protection operation may include a Single-Level Cell (SLC) program operation.

According to an embodiment, the general operation may include one of an erase operation, a read operation, a Multi-Level Cell (MLC) program operation, a Triple-Level Cell (TLC) program operation, and a Quadruple-Level Cell (QLC) program operation.

According to another embodiment of the present disclosure, an operating method of a memory device may be provided. According to the operating method, memory operations on one or more planes included therein are performed respectively, the memory operations except for the program operation are interrupted in response to a command from a controller. The memory operations including at least a program operation on a single-level cell (SLC).

BRIEF DESCRIPTION OF THE DRAWINGS

These and other features and advantages of the present invention will become apparent to those skilled in the art of the invention from the following detailed description of specific embodiments of the invention in reference with the accompanied drawings.

FIGS. 15A and 15B are diagrams illustrating that operations of a plurality of planes included in the semiconductor memory device 1100 are entirely or selectively interrupted according to an embodiment of the present disclosure.

DETAILED DESCRIPTION

Specific structural and functional features of the present disclosure are disclosed in the context of the following embodiments of the disclosure. However, the present disclosure may be configured, arranged, or carried out differently than disclosed herein. Thus, the present disclosure is not limited to any particular embodiment nor to any specific details. Also, throughout the specification, reference to "an embodiment," "another embodiment" or the like is not necessarily to only one embodiment, and different references to any such phrase are not necessarily to the same embodiment. Moreover, the use of an indefinite article (i.e., "a" or "an") means one or more, unless it is clear that only one is intended. Similarly, terms "comprising," "including," "having" and the like, when used herein, do not preclude the existence or addition of one or more other elements in addition to the stated element(s).

It should be understood that the drawings are simplified schematic illustrations of the described devices and may not include well known details for avoiding obscuring the features of the invention.

It should also be noted that features present in one embodiment may be used with one or more features of another embodiment without departing from the scope of the invention.

It is further noted, that in the various drawings, like reference numbers designate like elements.

Figure 1:
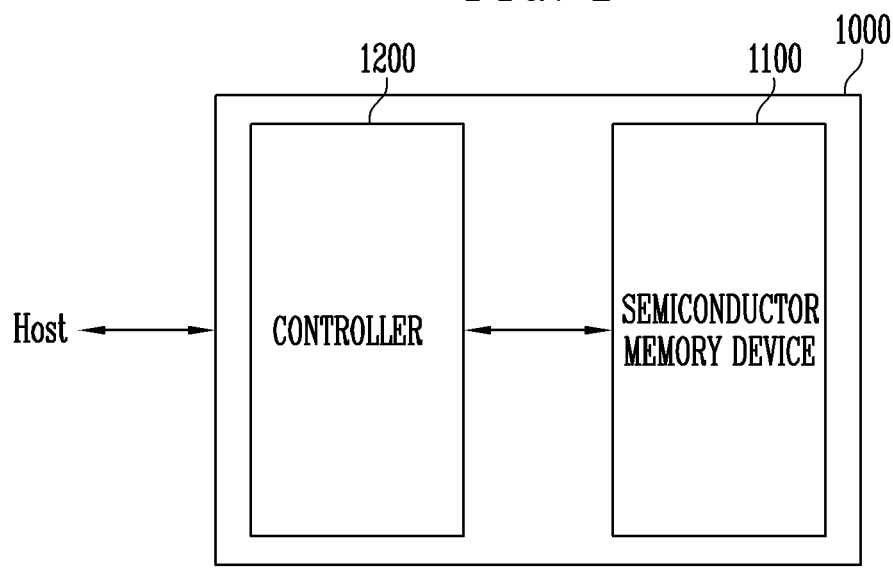
FIG. 1 is a diagram illustrating a memory system.

FIG. 1 is a diagram illustrating a memory system 1000.

Referring to FIG. 1, the memory system 1000 may include a semiconductor memory device 1100 for storing data and a controller 1200 controlling the semiconductor memory device 1100 in response to control of a host Host.

The host Host may communicate with the memory system 1000 using at least one of various communication methods such as a Universal Serial Bus (USB), Serial AT Attachment (SATA), Serial Attached SCSI (SAS), a High Speed Interchip (HSIC), Small Computer System Interface (SCSI), Peripheral Component Interconnection (PCI), PCI express (PCIe), NonVolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM).

The semiconductor memory device 1100 may be a volatile memory device losing stored data when a power supply is blocked or a non-volatile memory device retaining stored data even when a power supply is blocked. The controller 1200 may control the semiconductor memory device 1100 to perform a program, read, or erase operation. For example, during a program operation, the semiconductor memory device 1100 may receive a command, an address, and data from the controller 1200 and perform the program operation. During a read operation, the semiconductor memory device 1100 may receive a command and an address from the controller 1200 and output read data to the controller 1200. The semiconductor memory device 1100 may include an input/output circuit for inputting and outputting data.

The controller 1200 may control the general operations of the memory system 1000 and the data exchange between the host and the semiconductor memory device 1100. For example, the controller 1200 may control the semiconductor memory device 1100 to program, read or erase data in response to a request from the host. In addition, the controller 1200 may receive data and a logical address from the host and translate the logical address into a physical address indicating a region of the semiconductor device 1100 in which the data is actually stored.

The controller 1200 may generate a command according to a plurality of requests received from the host. More specifically, the semiconductor memory device 1100 may include a plurality of planes, and the controller 1200 may control a plane interleaving operation of the semiconductor memory device 1100 including the plurality of planes based on the plurality of requests received from the host. The controller 1200 may generate a read command to interleave and read data of different planes and may transfer the generated read command to the semiconductor memory device 1100 based on a plurality of read requests received from the host.

Figure 2:
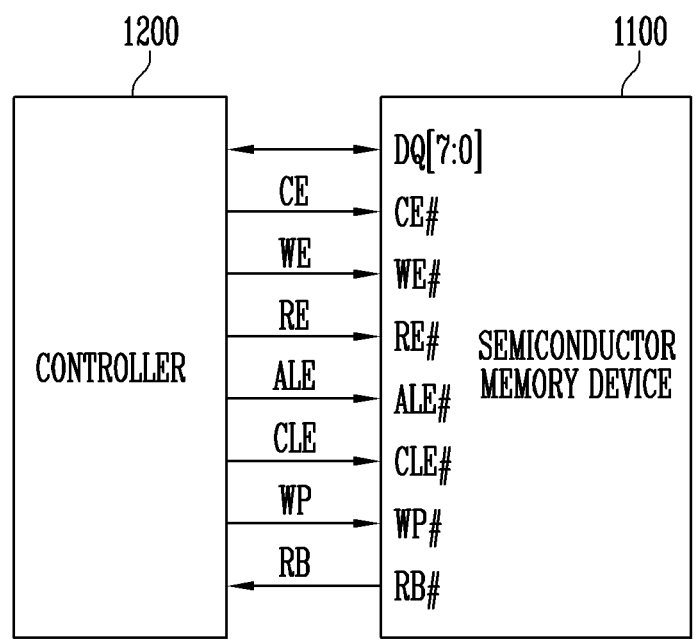
FIG. 2 is a diagram illustrating signals exchanged between a controller 1200 and a semiconductor memory device 1100.

FIG. 2 is a diagram illustrating signals exchanged between the controller 1200 and the semiconductor memory device 1100. Referring to FIG. 2, the controller 1200 and the semiconductor memory device 1100 may exchange a command, data, or an address through a pad DQ[7:0]. The semiconductor memory device 1100 may receive a chip enable signal CE, a write enable signal WE, a read enable signal RE, an address latch enable signal ALE, a command latch enable signal CLE, and a write protection signal WP through pads CE #, WE #, RE #, ALE #, CLE #, and WP #, respectively. In addition, the semiconductor memory device 1100 may output a ready/busy RB signal through a pad RB #. When the semiconductor memory device 1100 includes a plurality of planes, the semiconductor memory device 1100 may output a plurality of ready/busy signals corresponding to the planes, respectively.

Figure 3:
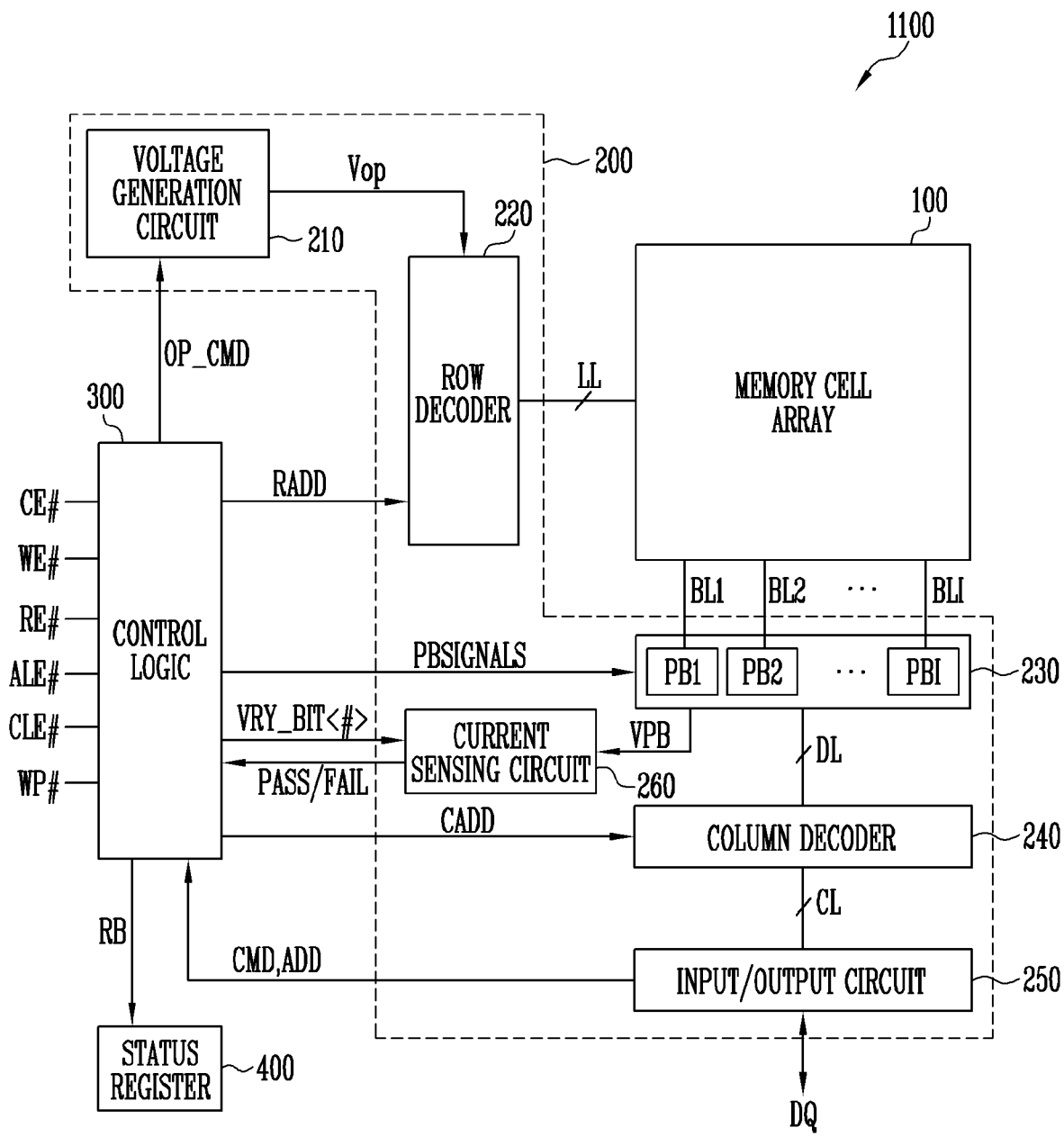
FIG. 3 is a detailed diagram illustrating a semiconductor memory device shown in FIGS. 1 and 2.

FIG. 3 is a detailed diagram illustrating the semiconductor memory device 1100 shown in FIGS. 1 and 2.

Referring to FIG. 3, the semiconductor memory device 1100 may be a volatile memory device or a non-volatile memory device. Although FIG. 3 shows a non-volatile memory device as an embodiment, embodiments of the present disclosure are not limited thereto.

The semiconductor memory device 1100 may include a memory cell array 100 storing data therein. The semiconductor memory device 1100 may include peripheral circuits 200 configured to perform a program operation to store data in the memory cell array 100, a read operation to output the stored data, and an erase operation to erase the stored data. The semiconductor memory device 1100 may include a control logic 300 for controlling the peripheral circuits 200 in response to control of the controller 1200 shown in FIG. 2. In addition, the semiconductor memory device 1100 may include a status register 400 indicating an operation state of the semiconductor memory device 1100.

The memory cell array 100 may include a plurality of memory cells where data is stored. For example, the memory cell array 100 may include one or more planes, and each of the planes may include one or more memory blocks. Each of the memory blocks may include a plurality of memory cells. A structure including a plurality of planes may be referred to as a multi-plane structure. The memory blocks may store user data and various types of information used for performing operations of the semiconductor memory device 1100. The memory blocks may have a two-dimensional or three-dimensional structure. To improve integration density, three-dimensionally structured memory blocks have been mainly used. Two-dimensional memory blocks may have memory cells arranged in parallel with a substrate, and three-dimensional memory blocks may include memory cells stacked in a vertical direction to the substrate.

The memory cell array 100 may have a two-dimensional or three-dimensional array structure. Hereinafter, a three-dimensional array structure is described as an embodiment. However, embodiments of the present disclosure are not limited to the three-dimensional array structure. The embodiments of the present disclosure may be applied not only to a flash memory device in which a charge storage layer includes a conductive floating gate (FG), but also to a charge trap flash (CTF) memory device in which a charge storage layer includes an insulating layer.

According to an embodiment, operation of the memory cell array 100 may include a Single-Level Cell (SLC) method in which one memory cell stores one data bit. Alternatively, operation of the memory cell array 100 may include a method in which one memory cell stores at least two data bits. For example, the memory cell array 100 may operate using a Multi-Level Cell (MLC) method in which one memory cell stores two data bits, a Triple-Level Cell (TLC) method in which one memory cell stores three data bits, or a Quadruple-Level Cell (QLC) method in which one memory cell stores four data bits.

The control logic 300 may control the peripheral circuits 200 to perform program, read and erase operations. For example, the peripheral circuits 200 may include a voltage generation circuit 210, a row decoder 220, a page buffer group 230, a column decoder 240, an input/output circuit 250 and a current sensing circuit 260.

The voltage generation circuit 210 may generate various operating voltages Vop applied to perform program, read and erase operations in response to an operation signal OP_CMD output from the control logic 300. For example, the control logic 300 may control the voltage generation circuit 210 to generate various voltages including a program voltage, a verify voltage, a pass voltage, a read voltage, and an erase voltage.

The voltage generation circuit 210 may apply the various operating voltages Vop to the row decoder 220, and the row decoder 220 may transfer the operating voltages Vop to local lines LL coupled to a selected memory block, among the memory blocks of the memory cell array 100, in response to a row address RADD. The local lines LL may include local word lines, a local drain select line, and a local source select line. In addition, the local lines LL may include various lines coupled to a memory block, such as a source line.

The page buffer group 230 may be coupled to bit lines BL1 to BLI coupled to the memory blocks of the memory cell array 100. The page buffer group 230 may include a plurality of page buffers PB1 to PBI coupled to the bit lines BL1 to BLI, respectively. The page buffers PB1 to PBI may operate in response to page buffer control signals PBSIG-NALS received from the control logic 300. For example, the page buffers PB1 to PBI may temporarily store data received through the bit lines BL1 to BLI, or sense voltages or currents of the bit lines BL1 to BLI during a read or verify operation.

The column decoder 240 may transfer data between the input/output circuit 250 and the page buffer group 230 in response to a column address CADD. For example, the column decoder 240 may exchange data with the page buffers PB1 to PBI through data lines DL, or exchange data with the input/output circuit 250 through column lines CL.

The input/output circuit 250 may receive a command CMD, an address ADD, and data from the controller 1200 shown in FIG. 1 through an input/output pad DQ, and may output the read data to the controller 1200 through the input/output pad DQ. For example, the input/output circuit 250 may transfer the command CMD and the address ADD received from the controller 1200 to the control logic 300, or may exchange data with the column decoder 240.

The current sensing circuit 260 may generate a reference current in response to an allowable bit VRY_BIT<#> and compare a sensing voltage VPB received from the page buffer group 230 with a reference voltage generated by the reference current to output a pass signal PASS or a fail signal FAIL during a read operation or a verify operation.

The control logic 300 may receive the command CMD and the address ADD in response to signals received through the pads CE #, WE #, RE #, ALE #, CLE # and WP #. The control logic 300 may control the peripheral circuits 200 by outputting the operation signal OP_CMD, the row address RADD, the page buffer control signals PBSIGNALS, and the allowable bit VRY_BIT<#> in response to the command CMD and the address ADD. The control logic 300 may determine whether a verify operation passes or fails in response to the pass signal PASS or the fail signal FAIL.

The status register 400 may store data indicating whether the semiconductor memory device 1100 is in a ready state or a busy state based on a ready/busy signal RB received from the control logic 300. The data may be transferred as a ready/busy signal to the controller 1200 through the RB # pad. When the memory cell array 100 has a multi-plane structure including a plurality of planes, the status register 400 may output a ready/busy signal corresponding to each plane.

Figure 4:
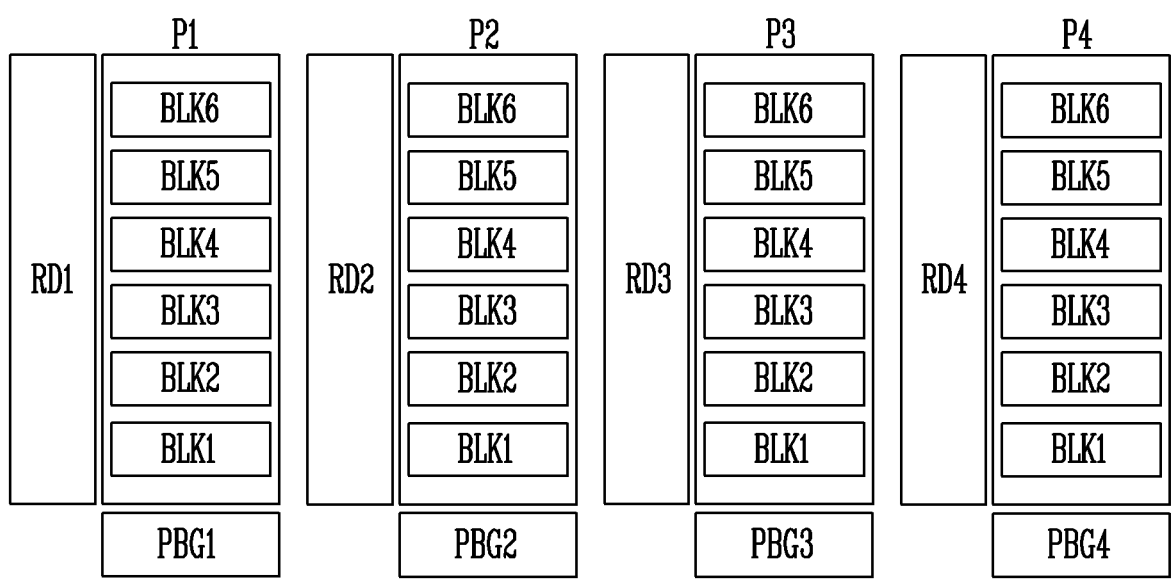
FIG. 4 is a diagram illustrating a multi-plane structure.

FIG. 4 is a diagram illustrating a multi-plane structure. Referring to FIG. 4, the semiconductor memory device 1100 has a multi-plane structure including a plurality of planes, e.g., first, second, third, and fourth planes P1, P2, P3, and P4. It is noted that the four planes are illustrated in FIG. 4 as an example, and that the number of planes may vary.

The first, second, third, and fourth planes P1, P2, P3, and P4 may be coupled to row decoders RD1 to RD4, respectively, and to page buffer groups PBG1 to PBG4, respectively. The first, second, third, and fourth planes P1, P2, P3, and P4 may operate independently of each other. For example, the first plane P1 may operate by being coupled to a first row decoder RD1 and a first page buffer group PBG1, the second plane P2 may operate by being coupled to a second row decoder RD2 and a second page buffer group PBG2, the third plane P3 may operate by being coupled to a third row decoder RD3 and a third page buffer group PBG3, and the fourth plane P4 may operate by being coupled to a fourth row decoder RD4 and a fourth page buffer group PBG4. All of the first, second, third, and fourth row decoders RD1, RD2, RD3, and RD4 and the first, second, third, and fourth page buffer groups PBG1, PBG2, PBG3, and PBG4 may be controlled by the control logic 300 shown in FIG. 3. The first, second, third, and fourth planes P1, P2, P3, and P4 may operate at the same time.

During a read operation which is described as an example, each of the first, second, third, and fourth row decoders RD1, RD2, RD3, and RD4 may receive a row address and apply a read voltage to a memory block selected from each of the first, second, third, and fourth planes P1, P2, P3, and P4 in response to the received row address. The first, second, third, and fourth page buffer groups PBG1, PBG2, PBG3, and PBG4 may sense a voltage or a current of bit lines coupled to the first, second, third, and fourth planes P1, P2, P3, and P4 to read data and temporarily store the read data. When entire sensing operations of the first, second, third, and fourth planes P1, P2, P3, and P4 are completed, the read data temporarily stored in the first, second, third, and fourth page buffer groups PBG1, PBG2, PBG3, and PBG4 may be sequentially output through the input/output circuit 250 shown in FIG. 3. For example, after the read data of the first page buffer group PBG1 is output first, the read data of the second, third, and fourth page buffer groups PBG2, PBG3, and PBG4 may be sequentially output.

Each of the plurality of planes may include a plurality of memory blocks. A multi-plane operation, in which operations on the plurality of planes are simultaneously performed, may be performed to process operations on respective memory blocks in parallel. According to an embodiment, a plane may be a unit of a memory region accessed when a program, read, or erase operation is performed. Accordingly, in a multi-plane structure in which the semiconductor memory device 1100 includes a plurality of planes, an erase, read, or program operation may be simultaneously performed on blocks or pages included in different planes.

Figure 5:
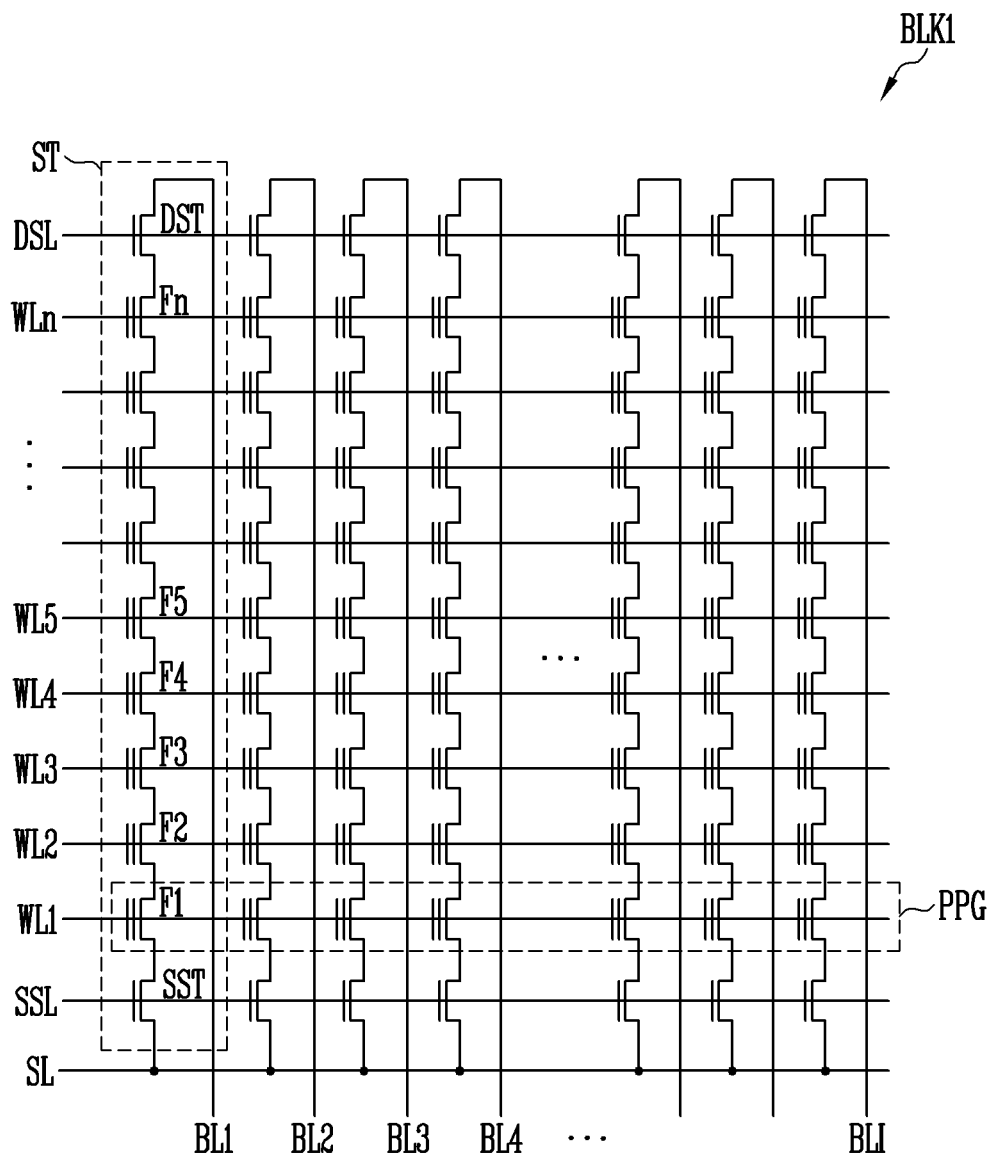
FIG. 5 is a diagram illustrating a memory block shown in FIG. 4.

FIG. 5 is a diagram illustrating a memory block shown in FIG. 4.

Referring to FIG. 5, a plurality of memory blocks BLK1 to BLK6 shown in FIG. 4 may have the same configuration. Accordingly, a first memory block BLK1 is described as an example.

The first memory block BLK1 may include a plurality of cell strings ST coupled between the bit lines BL1 to BLI and a source line SL. For example, the cell strings ST may be coupled to the bit lines BL1 to BLI, respectively, and may be coupled to the source line SL in common. Because the cell strings ST have similar configurations to each other, a cell string ST coupled to the first bit line BL1, among the cell strings ST, is described as an example as below.

The cell string ST may include a source select transistor SST, first to nth memory cells F1 to Fn, and a drain select transistor DST that are coupled in series between the source line SL and the first bit line BL1, where n is a positive integer. The number of source and drain select transistors SST and DST is not limited to that shown in FIG. 5. The source select transistor SST may be coupled between the source line SL and the first memory cell F1. The first to nth memory cells F1 to Fn may be coupled in series between the source select transistor SST and the drain select transistor DST. The drain select transistor DST may be coupled between the nth memory cell Fn and the first bit line BL1. Although not shown in FIG. 5, dummy cells may be further coupled between the memory cells F1 to Fn and the source select transistor SST or the drain select transistor DST.

Gates of the source select transistors SST included in different cell strings ST may be coupled to a source select line SSL, gates of the first to nth memory cells F1 to Fn included in different cell strings ST may be coupled to first to nth word lines WL1 to WLn, and gates of the drain select transistors DST included in different cell strings ST may be coupled to a drain select line DSL. A group of memory cells coupled to each of the word lines WL1 to WLn may be referred to as a page PG. For example, a group of the first memory cells F1 coupled to the first word line WL1, among the memory cells F1 to Fn included in different cell strings ST, may be a single physical page PPG. Program and read operations may be performed in units of physical pages PPG.

Figure 6:
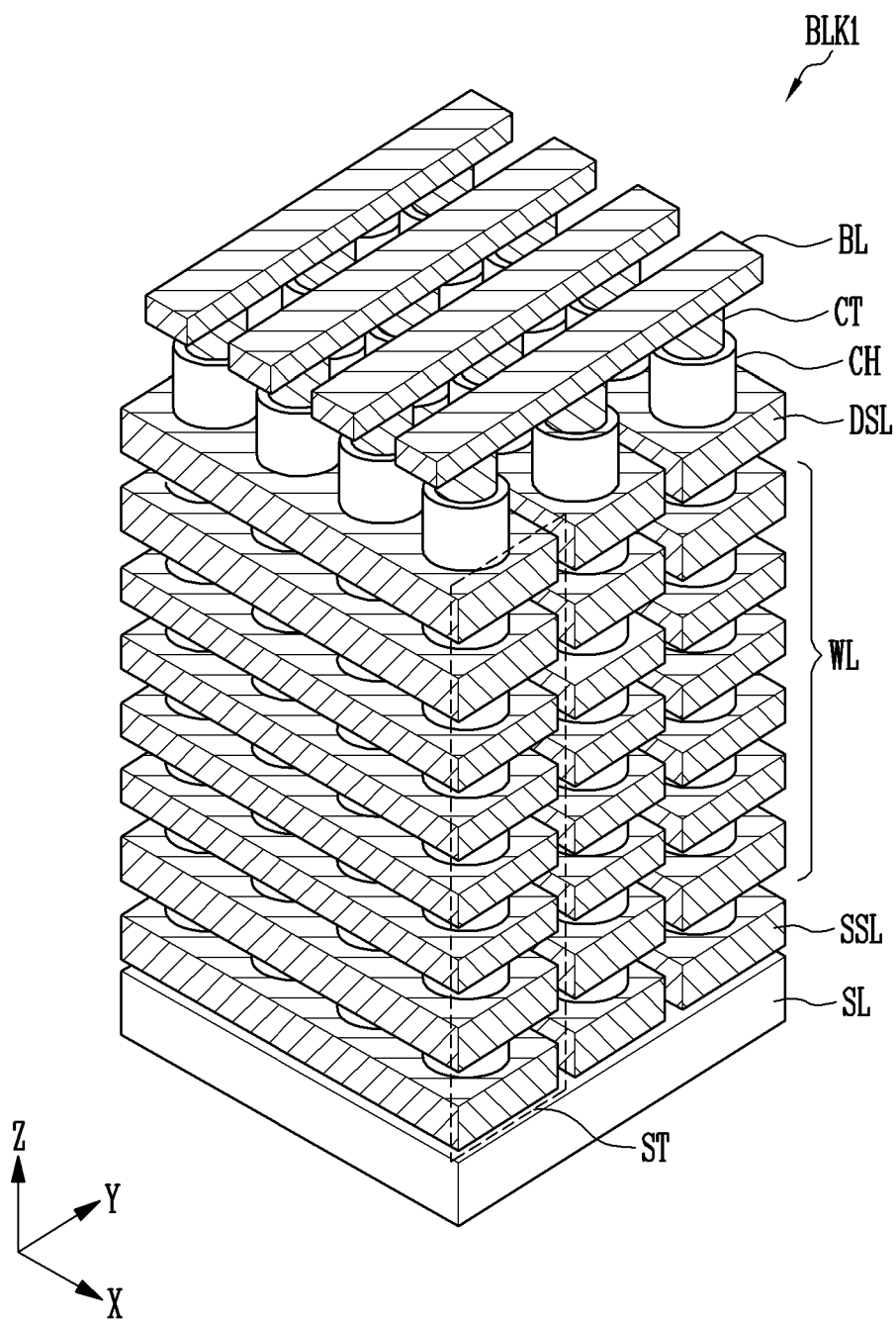
FIG. 6 is a diagram illustrating an embodiment of a three-dimensionally structured memory block of FIG. 5.

FIG. 6 is a diagram illustrating an embodiment of a three-dimensionally structured memory block of FIG. 5.

Referring to FIG. 6, the first memory block BLK1 having a three-dimensional structure may have an I shape perpendicular (Z direction) to a substrate and include the plurality of cell strings ST arranged between bit lines BL and the source line SL. Alternatively, a well may be formed instead of the source line SL. This structure may be referred to as a Bit Cost Scalable (BiCS) structure. For example, when the source line SL is formed in a horizontal direction to a top of the substrate, the cell strings ST having the BiCS structure may be formed in a vertical direction (Z direction) to a top of the source line SL.

More specifically, the cell strings ST may be arranged in a first direction (X direction) or a second direction (Y direction). The cell strings ST may include the source select line SSL, word lines WL, and the drain select line DSL stacked on and separated from each other. The numbers of the source select line SSL, the word lines WL and the drain select line DSL are not limited to those shown in FIG. 6 and may vary according to a design of each semiconductor memory device 1100. The cell strings ST may include vertical channel layers CH vertically passing through the source select line SSL, the word lines WL, and the drain select line DSL, and the bit lines BL contacting top portions of the vertical channel layers CH that protrude above top portions of the drain select line DSL and extending in the second direction (Y direction). Memory cells may be formed between the word lines WL and the vertical channel layers CH. Contact plugs CT may be further formed between the bit lines BL and the vertical channel layers CH.

Figure 7:
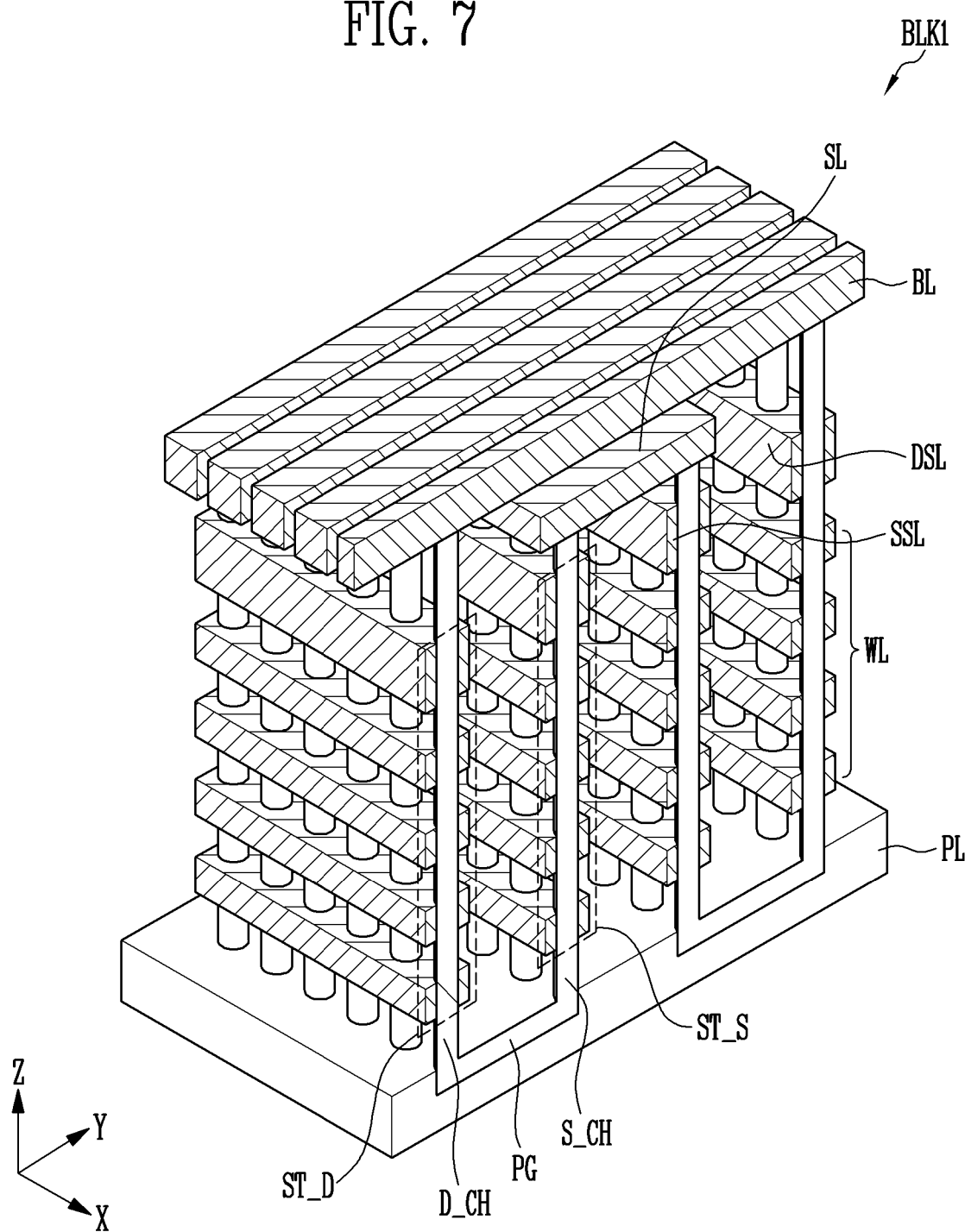
FIG. 7 is a diagram illustrating another embodiment of a three-dimensionally structured memory block of FIG. 5.

FIG. 7 is a diagram illustrating another embodiment of a three-dimensionally structured memory block of FIG. 5.

Referring to FIG. 7, the first memory block BLK1 having a three-dimensional structure may have a U shape perpendicular (Z direction) to a substrate and include source strings ST_S and drain strings ST_D coupled in pairs between the bit lines BL and the source line SL. The source strings ST_S and the drain strings ST_D may be coupled to each other through a pipe gate PG to form a U-shaped structure. The pipe gate PG may be formed in a pipe line PL. More specifically, the source strings ST_S may be vertically formed between the source line SL and the pipe line PL, and the drain strings ST_D may be vertically formed between the bit lines BL and the pipe line PL. This structure may be referred to as a Pipe-shaped Bit Cost Scalable (P-BiCS) structure.

More specifically, the drain strings ST_D and the source strings ST_S may be arranged in the first direction (X direction) and the second direction (Y direction), and the drain strings ST_D and the source strings ST_S may be alternately arranged in the second direction (Y direction). The drain strings ST_D may include the word lines WL and the drain select line DSL stacked on and separated from each other, and drain vertical channel layers D_CH vertically penetrating the word lines WL and the drain select line DSL. The source strings ST_S may include the word lines WL and the source select line SSL stacked on and separated from each other, and source vertical channel layers S_CH vertically penetrating the word lines WL and the source select line SSL. The drain vertical channel layers D_CH and the source vertical channel layers S_CH may be coupled to each other through the pipe gate PG in the pipe line PL. The bit lines BL may contact top portions of the drain vertical channel layers D_CH protruding above the drain select line DSL and extend in the second direction (Y direction).

The first memory block BLK1 may have various structures in addition to the structures described with reference to FIGS. 5 to 7.

Figure 8:
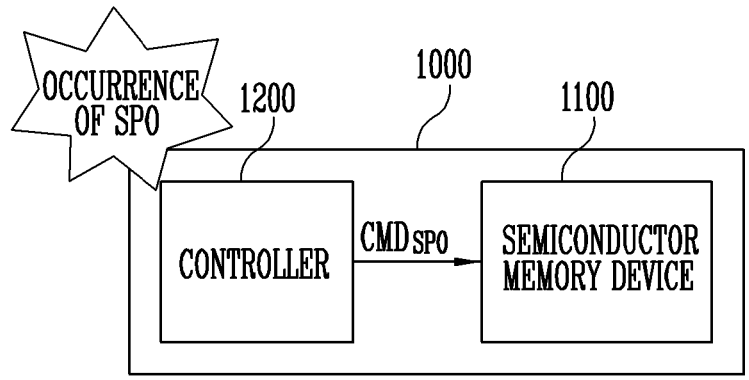
FIG. 8 is a diagram illustrating operations of a memory system according to an embodiment of the present disclosure.

FIG. 8 is a diagram illustrating operations of a memory system according to an embodiment of the present disclosure.

When the memory system 1000 is used in a system such as a mobile device, a phenomenon in which a power supply is abruptly stopped, that is, a Sudden Power Off (SPO) may occur. The Sudden Power Off, that is, the SPO may refer to a phenomenon in which power supplied to a memory system is abruptly blocked. When the SPO occurs during a program operation on a predetermined memory block of the semiconductor memory device 1100, the controller 1200 may transfer an SPO process command $CMD_{SPO}$ to the semiconductor memory device 1100. The SPO process command $CMD_{SPO}$ may notify the semiconductor memory device 1100 of the occurrence of a sudden power off to the memory system 1000. In response to the SPO process command $CMD_{SPO}$, the semiconductor memory device 1100 may interrupt operations of planes except for a plane performing a protection operation, among a plurality of operations which were being performed on a plurality of planes when the SPO occurred.

Figure 9:
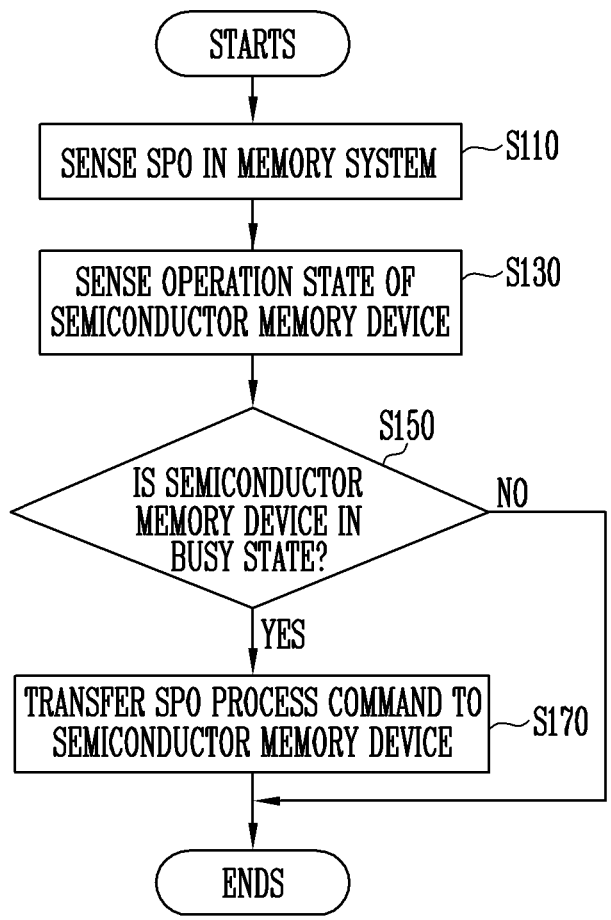
FIG. 9 is a flowchart illustrating a method of operating a controller according to an embodiment of the present disclosure.

FIG. 9 is a detailed flowchart illustrating a method of operating a controller according to an embodiment of the present disclosure.

Referring to FIG. 9, a method of operating the controller 1200 according to an embodiment of the present disclosure may include sensing an SPO of the memory system 1000 (S110), sensing an operation state of the semiconductor memory device 1100 (S130), determining whether the semiconductor memory device 1100 is in a busy state (S150), and transferring the SPO process command $CMD_{SPO}$ to the semiconductor memory device 1100 (S170).

At step S110, the controller 1200 may sense an SPO in the memory system 1000. For example, the controller 1200 may determine that the SPO occurs when a power voltage supplied to the memory system 1000 suddenly decreases. The controller 1200 may sense an SPO in the memory system 1000 by various methods in addition to the method described in step S110.

At step S130, the controller 1200 may sense an operation state of the semiconductor memory device 1100. More specifically, the controller 1200 may sense whether the semiconductor memory device 1100 is in a busy state indicating that the semiconductor memory device 1100 is currently operating or the semiconductor memory device 1100 is in a ready state indicating that the semiconductor memory device 1100 currently remains idle. For example, the controller 1200 may sense a current operation state of the semiconductor memory device 1100 by the ready/busy signal RB described with reference to FIG. 2.

At step S150, the controller 1200 may determine whether the semiconductor memory device 1100 is currently in a busy state based on the sensing result of step S130. When the semiconductor memory device 1100 is determined to be in a busy state (S150: Yes), the process flow may proceed to step S170 and the controller 1200 may transfer the SPO process command $CMD_{SPO}$ to the semiconductor memory device 1100. The semiconductor memory device 1100 may then interrupt all operations of the planes except for a protection operation, among the plurality of operations occurring on the planes, based on the received SPO process command $CMD_{SPO}$.

When the semiconductor memory device 1100 is determined not to be in a busy state (S150: No), it may refer to a state in which none of the plurality of planes included in the semiconductor memory device 1100 perform an operation. Accordingly, because the semiconductor memory device 1100 does not have to interrupt a predetermined operation, no action may be performed.

According to an example in the related art, when an SPO occurs in the memory system 1000, a reset command is transferred to the semiconductor memory device 1100 to interrupt operations on a plurality of planes across the substrate. Accordingly, even an essential operation which should be performed even in the occurrence of the SPO may also be interrupted. Therefore, when the memory system 1000 is turned on after the SPO, the controller 1200 may control the memory system 1000 to perform this essential operation again. Therefore, the design of firmware operated by the controller 1200 may be complicated.

According to another example in the related art, when an SPO occurs in the memory system 1000, no additional commands are transferred to the semiconductor memory device 1100 and the semiconductor memory device 1100 may complete an operation which is currently being performed. Accordingly, because operations, other than an essential operation which should be performed even in the occurrence of the SPO, are also performed, power consumed by the semiconductor memory device 1100 may increase after the SPO. Therefore, a power supply to the memory system 1000 may be completely blocked before the essential operation is completed. In a case where a power supply to the memory system 1000 and the semiconductor memory device 1100 included therein is completely blocked after an SPO occurs and before an essential operation performed by the semiconductor memory device 1100 is completed, the essential operation may also stop. Thus, when the memory system 1000 is turned on thereafter, a possibility of occurrence of error may increase. Because firmware of the controller 1200 should be designed to be able to deal with the error described above, costs of designing and manufacturing the memory system 1000 may increase.

According to a method of operating the controller 1200 according to an embodiment of the present disclosure, when an SPO occurs in the memory system 1000, the controller 1200 may determine whether the semiconductor memory device 1100 is currently operating (S130 and S150) and transfer the SPO process command $CMD_{SPO}$ to the semiconductor memory device 1100. The semiconductor memory device 1100 may interrupt operations except for a protection operation which should proceed even in the occurrence of the SPO in response to the SPO process command $CMD_{SPO}$. Accordingly, when the SPO occurs in the memory system 1000, the protection operation among operations on a plurality of planes of the semiconductor memory device 1100 may proceed and operations except for the protection operation may be interrupted. Therefore, power consumed for performing operations except for an essential operation may be reduced. Thereby, stability of the memory system 1000 may be improved.

Figure 10:
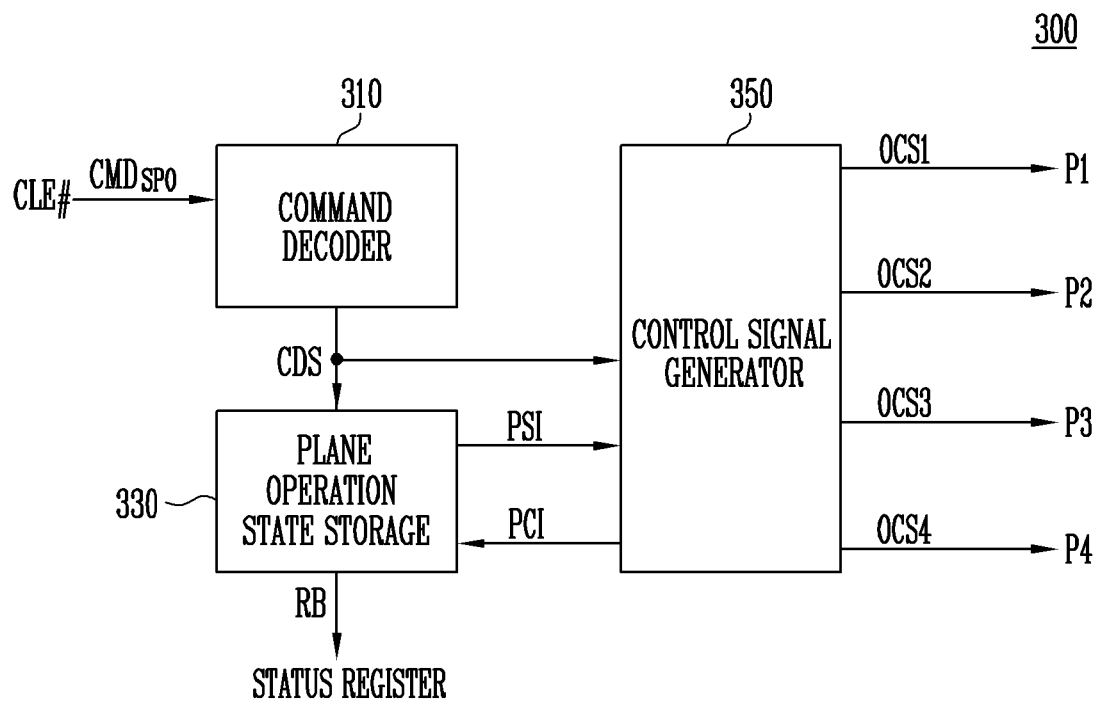
FIG. 10 is a block diagram illustrating an embodiment of a control logic 300 shown in FIG. 3.

FIG. 10 is a block diagram illustrating an embodiment of the control logic 300 shown in FIG. 3.

Referring to FIG. 10, the control logic 300 may include a command decoder 310, plane operation state storage 330, and a control signal generator 350.

The command decoder 310 may receive a command transferred to the pad DQ[7:0] based on a command latch enable signal CE received through the pad CLE #. The command decoder 310 may decode the received command to generate a command decoding signal CDS and transfer the generated command decoding signal CDS to the control signal generator 350 and the plane operation state storage 330. More specifically, when the command received by the command decoder 310 is the SPO process command $CMD_{SPO}$, the command decoding signal CDS may indicate that an SPO occurred in the memory system 1000.

The plane operation state storage 330 may transfer plane operation state information PSI to the control signal generator 350 in response to the received command decoding signal CDS. The plane operation state information PSI may indicate an operation state of each of the plurality of planes included in the semiconductor memory device 1100. More specifically, the plane operation state information PSI may indicate whether each of the plurality of planes is currently operating and may also indicate which operation the currently operating plane performs. Meanwhile, the plane operation state storage 330 may generate and transfer the ready/busy signal RB with respect to each of the planes P1, P2, P3, and P4 to the status register 400.

The control signal generator 350 may generate operation control signals OCS1, OCS2, OCS3, and OCS4 for controlling operations on the plurality of planes P1, P2, P3, and P4, respectively, based on the received command decoding signal CDS and plane operation state information PSI. The operation control signals OCS1, OCS2, OCS3, and OCS4 may be transferred to the peripheral circuits 200 shown in FIG. 3 to control operations on respective planes included in the memory cell array 100. A first operation control signal OCS1 may control an operation on the first plane P1. A second operation control signal OCS2 may control an operation on the second plane P2. A third operation control signal OCS3 may control an operation on the third plane P3. A fourth operation control signal OCS4 may control an operation on the fourth plane P4.

According to an embodiment, the control signal generator 350 may generate an operation control signal for a plane performing a protection operation to keep performing the protection operation based on the plane operation state information PSI. In addition, the control signal generator 350 may generate an operation control signal for a plane performing an operation other than the protection operation to interrupt the operation immediately.

In addition, when a predetermined plane completes an operation, the control signal generator 350 may generate and transfer plane operation completion information PCI to the plane operation state storage 330. The plane operation state storage 330 may update an operation state of the predetermined plane based on the plane operation completion information PCI. For example, when the plane operation completion information PCI indicating that the first plane P1 has completed an operation is received, the plane operation state storage 330 may update an operation state of the first plane P1 to a ready state. Accordingly, the plane operation state storage 330 may generate and transfer the ready/busy signal RB indicating that the first plane P1 is currently in a ready state to the status register 400.

Figure 11:
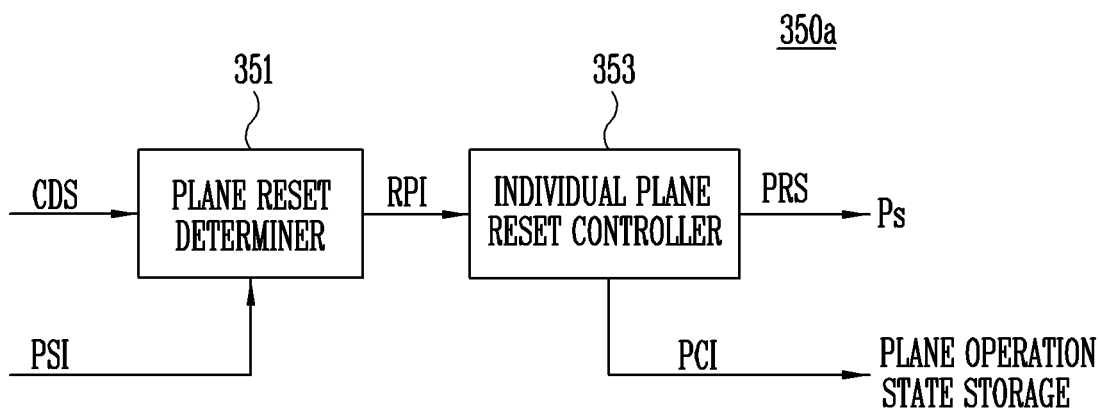
FIG. 11 is a block diagram illustrating an embodiment of a control signal generator 350a shown in FIG. 10.

FIG. 11 is a block diagram illustrating an embodiment of a control signal generator 350a shown in FIG. 10. Referring to FIG. 11, the control signal generator 350a may include a plane reset determiner 351 and an individual plane reset controller 353. The plane reset determiner 351 may include all circuits, systems, software, firmware and devices necessary for its operation and function.

The plane reset determiner 351 may receive the command decoding signal CDS from the command decoder 310. When a command received by the command decoder 310 is the SPO process command $CMD_{SPO}$, the command decoding signal CDS output from the command decoder 310 may be a signal to instruct that operations on planes except for a plane performing a protection operation are to be interrupted.

The plane reset determiner 351 may receive the plane operation state information PSI from the plane operation state storage 330. The plane reset determiner 351 may determine a plane on which an operation currently being performed is to be interrupted based on the plane operation state information PSI. The plane reset determiner 351 may generate and transfer reset plane information RPI indicating the determined plane to the individual plane reset controller 353. More specifically, the plane reset determiner 351 may generate the reset plane information RPI depending on whether an operation that a plane performs is a protection operation. For example, referring to the plane operation state information PSI, when the second plane P2 performs a protection operation, the plane reset determiner 351 might not generate the reset plane information RPI about the second plane P2. In another example, referring to the plane operation state information PSI, when the third plane P3 performs a general operation other than a protection operation, the plane reset determiner 351 may generate the reset plane information RPI about the third plane P3. Accordingly, the reset plane information RPI may include information identifying a plane which should interrupt an operation.

The individual plane reset controller 353 may generate and transfer a plane reset signal PRS, as the operation control signal OCS for controlling a plane to reset a currently performed operation to a determined plane Ps in response to the reset plane information RPI. For example, when the reset plane information RPI corresponding to the third plane P3 is received, the individual plane reset controller 353 may generate and transfer the plane reset signal PRS as the operation control signal OCS3 to the third plane P3. When the plane reset signal PRS is transferred to the third plane P3, an operation currently performed on the third plane P3 may be interrupted. Thereby, the individual plane reset controller 353 may generate the plane operation completion information PCI indicating that the operation on the third plane P3 has been interrupted and may transfer the generated plane operation completion information PCI to the plane operation state storage 330.

In the semiconductor memory device 1100 according to an embodiment of the present disclosure, operations except for a protection operation, among operations performed by a plurality of planes, may be interrupted in response to the SPO process command $CMD_{SPO}$ that is received when the SPO occurs. Therefore, when an SPO occurs, the power which is consumed for performing the general operations other than an essential operation may be reduced. Thereby, stability of the memory system 1000 may be improved.

A protection operation according to the present disclosure may be an operation that should not be stopped even when the SPO occurs. According to an embodiment, an operation of programming a memory block with data may be an operation which should be kept. Accordingly, the operation of programming the memory block with the data may be included in a protection operation. A read operation of the data or an erase operation of the memory block may correspond to a general operation, which is not included in the protection operation.

According to another embodiment, a programming method for using some of the memory blocks as an SLC buffer may include an SLC program operation for programming the SLC buffer with data and a data migration operation for programming an MLC block, a TLC block, or a QLC block with the data stored in the SLC buffer.

More specifically, a single-level cell (SLC) block of the semiconductor memory device 1100 according to an embodiment may be used as an SLC buffer. The semiconductor memory device 1100 may perform the SLC program operation for programming the SLC block first with program data received during a program operation and may then move and write the data programmed into the SLC block to a general memory block, that is, the MLC block, the TLC block, or the QLC block. The SLC block may be referred to as the SLC buffer. An operation of moving and writing the data programmed into the SLC buffer to the other general memory block, that is, the MLC block, the TLC block, or the QLC block may be referred to as a data migration operation of the SLC buffer. In the semiconductor memory device 1100 programming data using an SLC buffer, the performance of the SLC program may be kept even when the SPO occurs. Accordingly, the SLC program operation may be included in the protection operation. Operations of moving and writing the data programmed into the SLC buffer to the MLC block, the TLC block, or the QLC block may be referred to as an MLC program operation, a TLC program operation, or a QLC program operation, respectively.

Contrary to the SLC program operation, the MLC program operation, the TLC program operation, or the QLC program operation included in the data migration operation of the SLC buffer may require a relatively long time to complete the operation and consume relatively more power than the SLC program operation. Accordingly, the MLC program operation, the TLC program operation, or the QLC program operation may correspond to a general operation, which is not included in the protection operation. In another example, a read operation of data or an erase operation of the memory block may correspond to a general operation, which is not included in the protection operation.

However, the operations described above are merely classified into the protection operation and the general operation as an example. Accordingly, it is understood that operations included in the protection operation may be variously changed as needed.

Figure 12A:
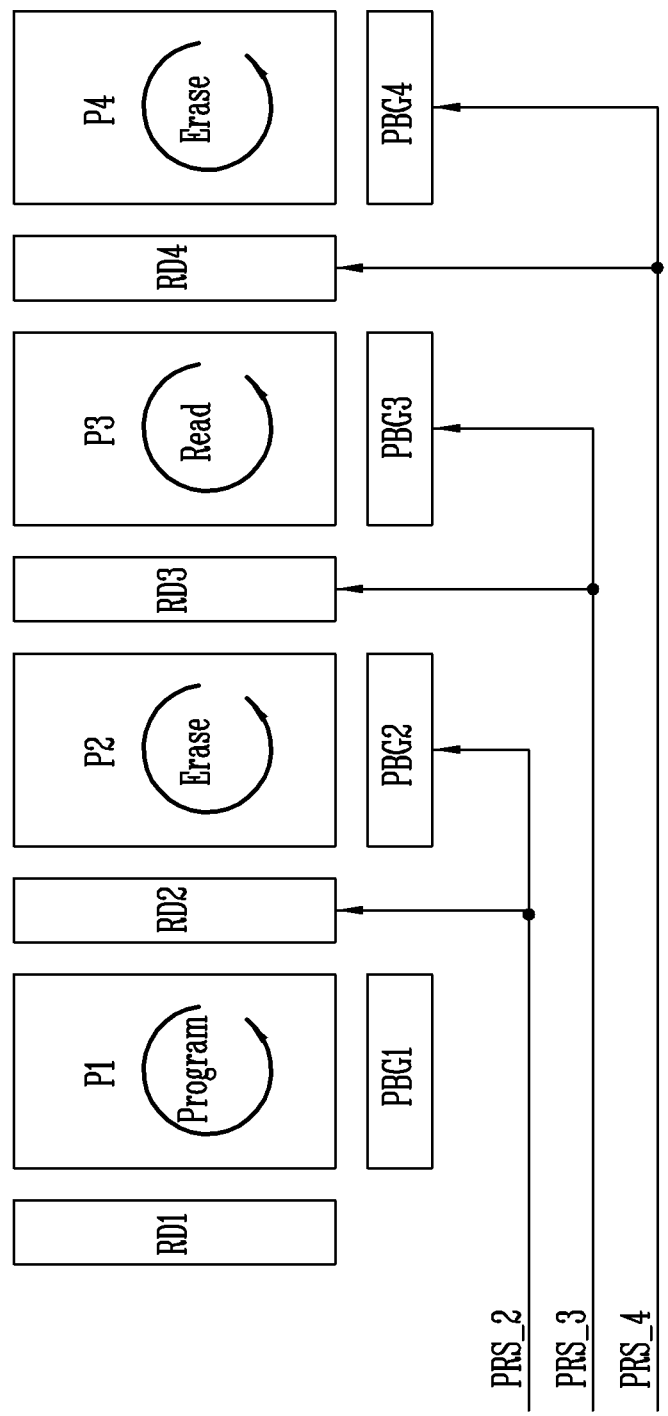
FIGS. 12A and 12B are diagrams illustrating that operations of a plurality of planes included in the semiconductor memory device 1100 are selectively interrupted according to an embodiment of the present disclosure.
Figure 12B:
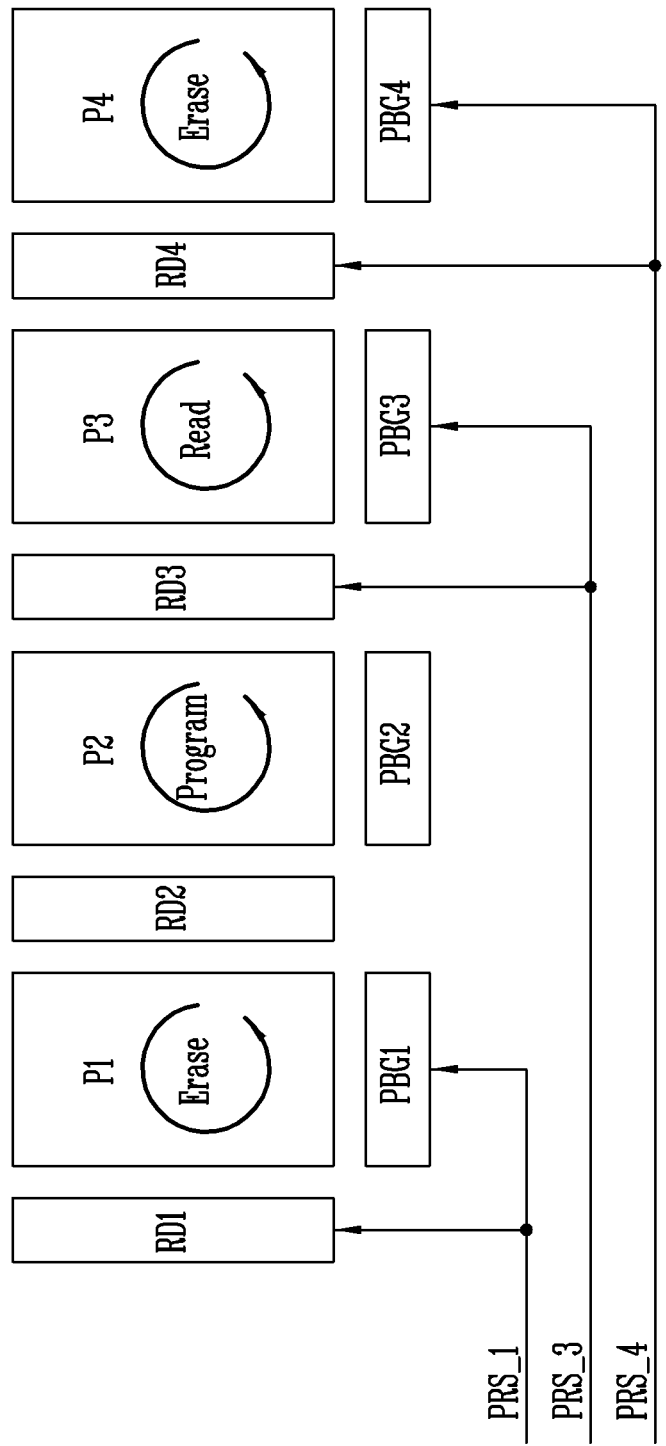

FIGS. 12A and 12B are diagrams illustrating that operations of a plurality of planes included in the semiconductor memory device 1100 are selectively interrupted according to an embodiment of the present disclosure.

Referring to FIG. 12A, the first plane P1 may perform a program operation, the second plane P2 may perform an erase operation, the third plane P3 may perform a read operation, and the fourth plane P4 may perform an erase operation. In the example shown in FIG. 12A, the program operation may be included in a protection operation, and the erase operation and the read operation may be included in a general operation but not the protection operation.

The plane operation state storage 330 may transfer, to the control signal generator 350, the plane operation state information PSI indicating what operation each of the planes P1, P2, P3, and P4 is currently performing. That is, the plane operation state information PSI may indicate that the first plane P1 is performing the program operation, the second plane P2 is performing the erase operation, the third plane P3 is performing the read operation, and the fourth plane P4 is performing the erase operation.

The plane reset determiner 351 may determine whether to interrupt an operation on each of planes P1, P2, P3, and P4, referring to the plane operation state information PSI. More specifically, the plane reset determiner 351 may determine not to interrupt but to keep performing the operation of the first plane P1 that performs the protection operation. In addition, the plane reset determiner 351 may determine to interrupt the operations of the second, third, and fourth planes P2, P3, and P4 that perform the general operations. Accordingly, the plane reset determiner 351 may generate and transfer, to the individual plane reset controller 353, the reset plane information RPI identifying the second, third, and fourth planes P2, P3, and P4 on which operations are to be interrupted. The individual plane reset controller 353 may generate the plane reset signals PRS as the operation control signals OCS2, OCS3, and OCS4 respectively for controlling the second, third, and fourth planes P2, P3, and P4 to reset the operations that are being performed based on the reset plane information RPI and transfer the generated plane reset signal PRS to the second, third, and fourth planes P2, P3, and P4.

More specifically, the individual plane reset controller 353 may generate and transfer a second plane reset signal PRS_2 for controlling the second plane P2 to reset the operation of the second plane P2 to the second row decoder RD2 and the second page buffer group PBG2. Accordingly, the erase operation on the second plane P2 may be interrupted. In addition, the individual plane reset controller 353 may generate and transfer third and fourth plane reset signals PRS_3 and PRS_4 for controlling the third and fourth planes P3 and P4 to reset the operations of the third and fourth planes P3 and P4 to the third and fourth row decoders RD3 and RD4, and the third and fourth page buffer groups PBG3 and PBG4, respectively. Accordingly, the read operation on the third plane P3 and the erase operation on the fourth plane P4 may be interrupted.

Referring to FIG. 12B, the first plane P1 may perform an erase operation, the second plane P2 may perform a program operation, the third plane P3 may perform a read operation, and the fourth plane P4 may perform an erase operation.

Accordingly, the plane operation state storage 330 may transfer the plane operation state information PSI indicating what operation each of the planes P1, P2, P3, and P4 is currently performing to the control signal generator 350.

The plane reset determiner 351 may determine to interrupt the operations of the first, third, and fourth planes P1, P3, and P4. Accordingly, the plane reset determiner 351 may generate and transfer the reset plane information RPI identifying the first, third, and fourth planes P1, P3, and P4 on which operations are to be interrupted to the individual plane reset controller 353. The individual plane reset controller 353 may generate the first, third, and fourth plane reset signals PRS_1, PRS_3, and PRS_4 for controlling the first, third, and fourth planes P1, P3, and P4 to reset the operations that are performed thereof based on the reset plane information RPI and transfer the generated first, third, and fourth plane reset signals PRS_1, PRS_3, and PRS_4 to the first, third, and fourth planes P1, P3, and P4, respectively. Accordingly, the erase operation on the first plane P1, the read operation on the third plane P3, and the erase operation on the fourth plane P4 may be interrupted.

Figure 13:
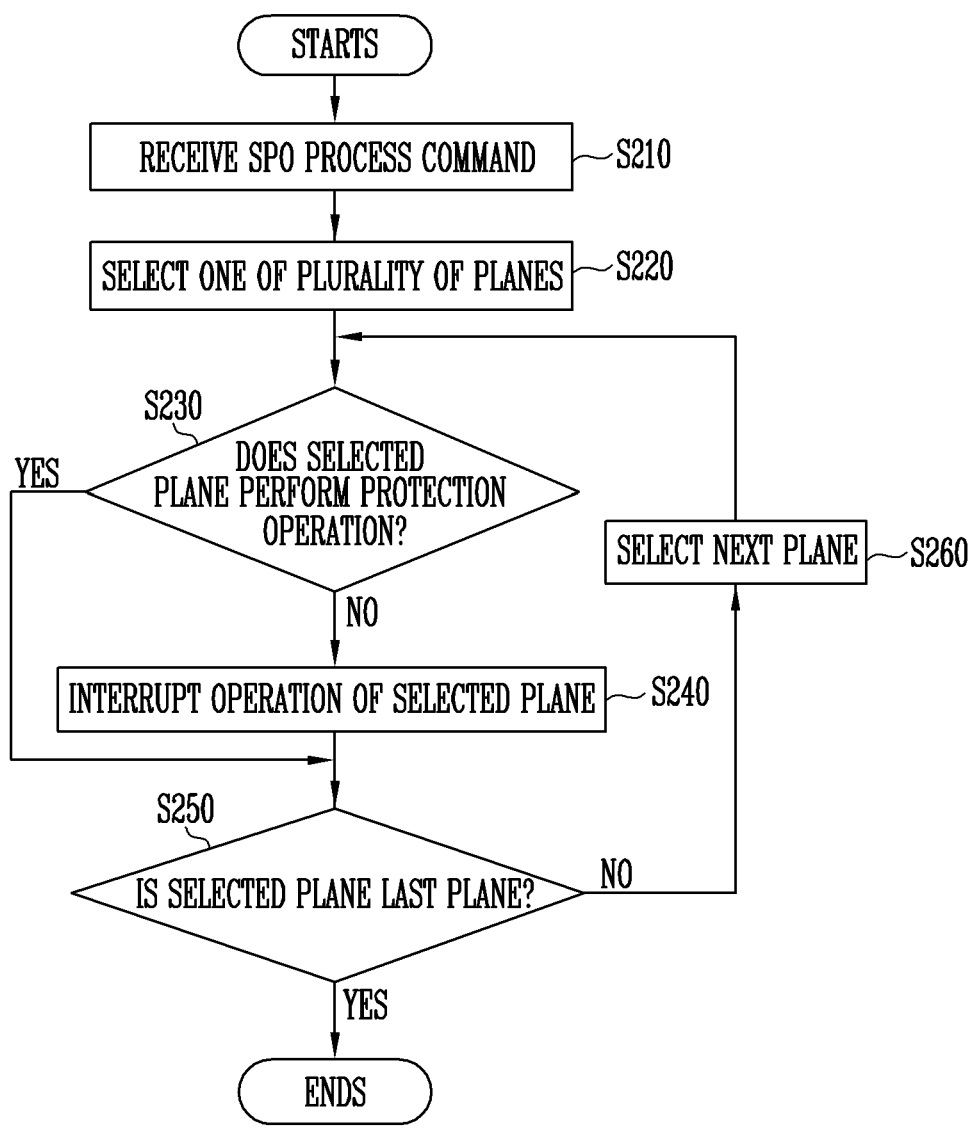
FIG. 13 is a flowchart illustrating a method of operating the semiconductor memory device 1100 according to an embodiment of the present disclosure.

FIG. 13 is a flowchart illustrating a method of operating the semiconductor memory device 1100 according to an embodiment of the present disclosure. Hereinafter, a description will be made with reference to FIGS. 10, 11, and 12A.

According to a method of operating the semiconductor memory device 1100 according to an embodiment of the present disclosure, the command decoder 310 of the control logic 300 may receive the SPO process command $CMD_{SPO}$ (S210). The command decoder 310 may transfer the command decoding signal CDS generated by decoding the SPO process command $CMD_{SPO}$ to the control signal generator 350 and the plane operation state storage 330. The plane operation state storage 330 may transfer the plane operation state information PSI to the control signal generator 350 in response to the received command decoding signal CDS.

The plane reset determiner 351 of the control signal generator 350 may select one of the plurality of planes (S220). The control signal generator 350 may determine whether a selected plane, for example, the first plane P1 in the example described with reference to FIG. 12A, is performing a protection operation based on the plane operation state information PSI received from the plane operation state storage 330 (S230).

When the selected plane performs the protection operation (S230: Yes), the process flow may proceed to step S250 without interrupting the operation of the selected plane. At step S250, it is determined whether the currently selected plane is the last plane. Because the currently selected first plane P1 is not the last plane (S250: No), the process flow may proceed to step S260, select a next plane, that is, the second plane P2, and may then proceed to step S230.

Because a general operation, not the protection operation, is performed on the selected second plane P2 (S230: No), the operation of the selected plane is interrupted (S240). At step S240, the plane reset determiner 351 may generate and transfer the reset plane information RPI indicating that the operation of the selected plane, for example, the second plane P2, should be interrupted to the individual plane reset controller 353. The individual plane reset controller 353 may generate and transfer the second plane reset signal PRS_2 for controlling the second plane P2 to reset the operation that the second plane P2 is performing to the second plane P2. The processes described above are repeatedly performed on the third plane P3 and the fourth plane P4.

Figure 14:
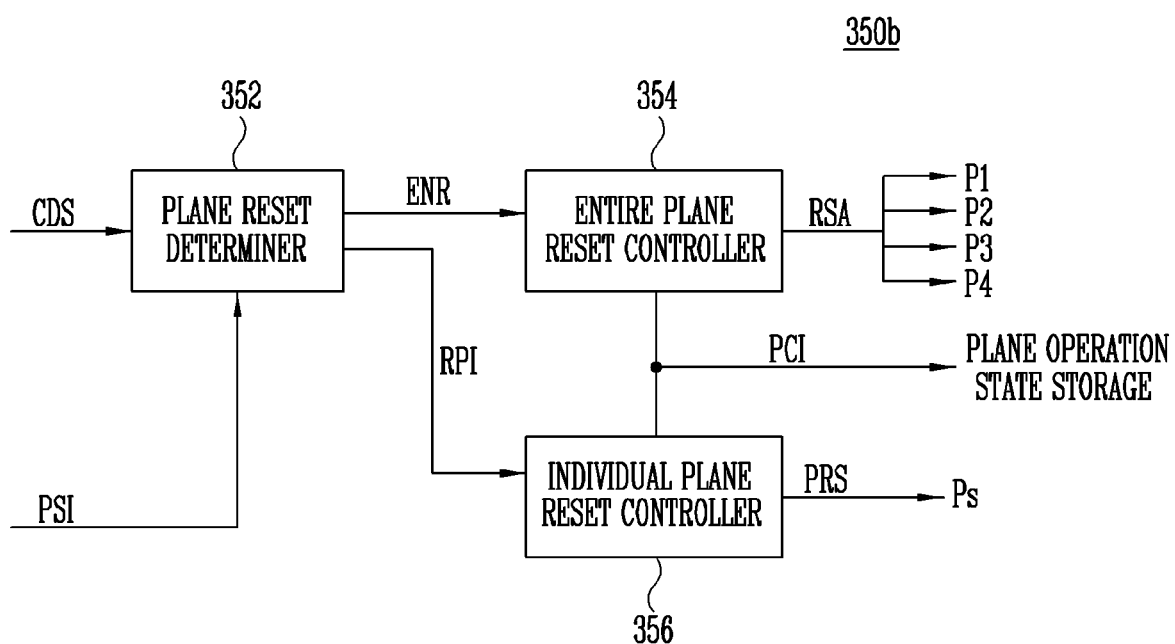
FIG. 14 is a block diagram illustrating another embodiment of a control signal generator 350b shown in FIG. 10.

FIG. 14 is a block diagram illustrating another embodiment of a control signal generator 350b shown in FIG. 10. Referring to FIG. 14, the control signal generator 350b may include a plane reset determiner 352, an entire plane reset controller 354, and an individual plane reset controller 356. The plane reset determiner 352 may include all circuits, systems, software, firmware and devices necessary for its operation and function.

The plane reset determiner 352 may receive the command decoding signal CDS from the command decoder 310. When a command received by the command decoder 310 is the SPO process command $CMD_{SPO}$, the command decoding signal CDS output from the command decoder 310 may be a signal to instruct that operations of planes except for a plane performing a protection operation are to be interrupted.

The plane reset determiner 352 may receive the plane operation state information PSI from the plane operation state storage 330. The plane reset determiner 352 may determine whether a plane performing a protection operation exists, among the plurality of planes P1, P2, P3, and P4, based on the plane operation state information PSI.

When a plane performing a protection operation does not exist among the plurality of planes P1, P2, P3, and P4, the plane reset determiner 352 may generate and transfer a reset enable signal ENR to the entire plane reset controller 354. The entire plane reset controller 354 may generate and transfer an entire plane reset signal RSA for controlling all planes to be reset to the first, second, third, and fourth planes P1, P2, P3, and P4, in response to the reset enable signal ENR. When the entire plane reset signal RSA is transferred to the first, second, third, and fourth planes P1, P2, P3, and P4, operations performed on the first, second, third, and fourth planes P1, P2, P3, and P4 may be interrupted. Thereby, the entire plane reset controller 354 may generate the plane operation completion information PCI indicating that the operations on the first, second, third, and fourth planes P1, P2, P3, and P4 have been interrupted and may transfer the plane operation completion information PCI to the plane operation state storage 330.

When a plane performing a protection operation exists among the plurality of planes P1, P2, P3, and P4, the plane reset determiner 352 may determine to interrupt operations on planes except for the plane performing the protection operation. The plane reset determiner 352 may generate and transfer the reset plane information RPI indicating a plane on which the operation is determined to be interrupted to the individual plane reset controller 356. The individual plane reset controller 356 may generate and transfer the plane reset signal PRS for controlling a plane to reset a currently performed operation to the determined plane Ps in response to the reset plane information RPI. For example, when the reset plane information RPI corresponding to the third plane P3 is received, the individual plane reset controller 356 may generate and transfer the plane reset signal PRS to the third plane P3. When the plane reset signal PRS is transferred to the third plane P3, an operation currently performed on the third plane P3 may be interrupted. Thereby, the individual plane reset controller 356 may generate and transfer the plane operation completion information PCI indicating that the operation on the third plane P3 has been interrupted to the plane operation state storage 330. The individual plane reset controller 356 shown in FIG. 14 may operate in substantially the same manner as the individual plane reset controller 353 shown in FIG. 11.

Figure 15B:
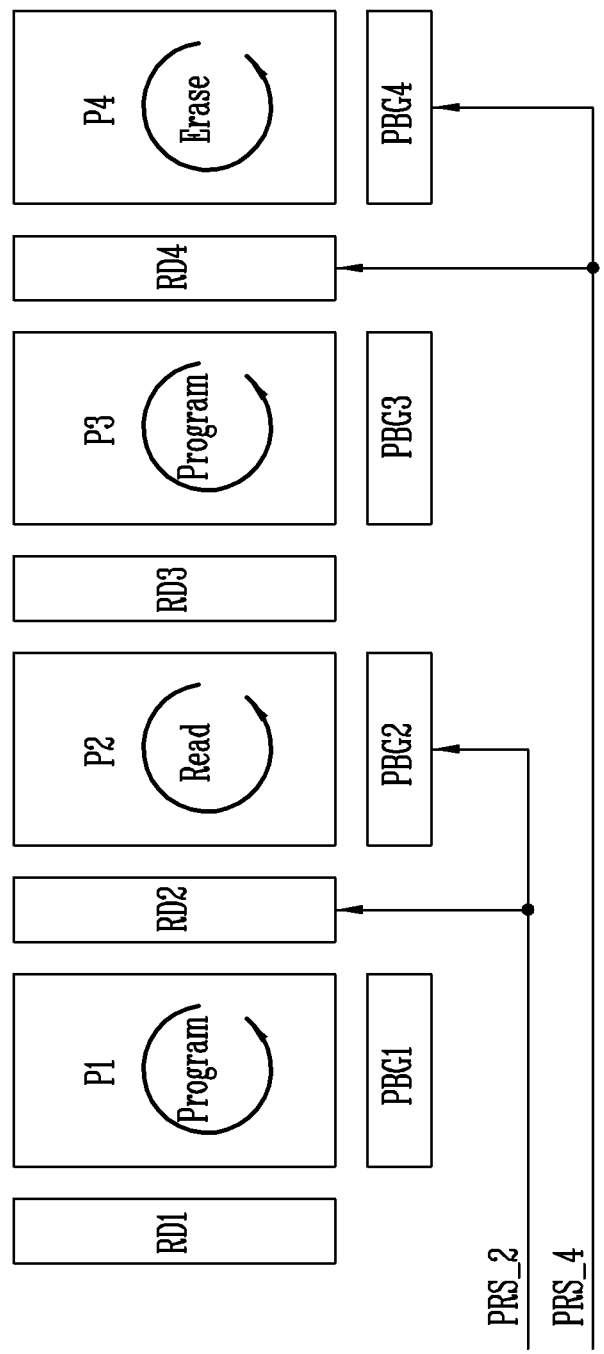

FIGS. 15A and 15B are diagrams illustrating that operations of a plurality of planes included in the semiconductor memory device 1100 are entirely or selectively interrupted according to an embodiment of the present disclosure.

Referring to FIG. 15A, the first plane P1 may perform a read operation, the second plane P2 may perform an erase operation, the third plane P3 may perform a read operation, and the fourth plane P4 may perform an erase operation. In an example shown in FIG. 15A, the program operation may be included in a protection operation, and the erase operation and the read operation may be included in a general operation but not the protection operation.

The plane operation state storage 330 may transfer the plane operation state information PSI indicating what operation each of the planes P1, P2, P3, and P4 is currently performing to the control signal generator 350. In other words, the plane operation state information PSI may be information indicating that the first plane P1 is performing the read operation, the second plane P2 is performing the erase operation, the third plane P3 is performing the read operation, and the fourth plane P4 is performing the erase operation.

The plane reset determiner 352 may determine whether to interrupt an operation on each of the planes P1, P2, P3, and P4, by referring to the plane operation state information PSI. A plane performing a protection operation does not exist among the first, second, third, and fourth planes P1, P2, P3, and P4. Thereby, the plane reset determiner 352 may generate and transfer the reset enable signal ENR to the entire plane reset controller 354. The entire plane reset controller 354 may generate and transfer the entire plane reset signal RSA for controlling all planes to be reset to the first, second, third, and fourth planes P1, P2, P3, and P4, in response to the reset enable signal ENR. More specifically, the entire plane reset signal RSA may be transferred to the first, second, third, and fourth row decoders RD1, RD2, RD3, and RD4, and the first, second, third, and fourth page buffer groups PBG1, PBG2, PBG3, and PBG4. Accordingly, all operations of the first, second, third, and fourth planes P1, P2, P3, and P4 may be interrupted.

Referring to FIG. 15B, the first plane P1 may perform a program operation, the second plane P2 may perform a read operation, the third plane P3 may perform a program operation, and the fourth plane P4 may perform an erase operation.

The plane operation state storage 330 may transfer the plane operation state information PSI indicating what operation each of the planes P1, P2, P3, and P4 is currently performing to the control signal generator 350.

The plane reset determiner 352 may determine whether to interrupt an operation on each of the planes P1, P2, P3, and P4, by referring to the plane operation state information PSI. A plane performing a protection operation exists among the first, second, third, and fourth planes P1, P2, P3, and P4. Accordingly, the plane reset determiner 352 may generate the reset plane information RPI identifying the second and fourth planes P2 and P4 which perform a general operation, but not a protection operation, among the first, second, third, and fourth planes P1, P2, P3, and P4 and may transfer the generated reset plane information RPI to the individual plane reset controller 356. The individual plane reset controller 356 may generate the plane reset signal PRS controlling the second and fourth planes P2 and P4 to reset operations that are currently being performed, and may transfer the generated plane reset signal PRS to the second and fourth planes P2 and P4 in response to the reset plane information RPI.

More specifically, the individual plane reset controller 356 may generate the second plane reset signal PRS_2 for controlling the second plane P2 to reset the operation thereof and transfer the generated second plane reset signal PRS_2 to the second row decoder RD2 and the second page buffer group PBG2. The individual plane reset controller 356 may generate the fourth plane reset signal PRS_4 for controlling the fourth plane P4 to reset the operation thereof and transfer the generated fourth plane reset signal PRS_4 to the fourth row decoder RD4 and the fourth page buffer group PBG4. Accordingly, the read operation of the second plane P2 and the erase operation of the fourth plane P4 may be interrupted.

Figure 16:
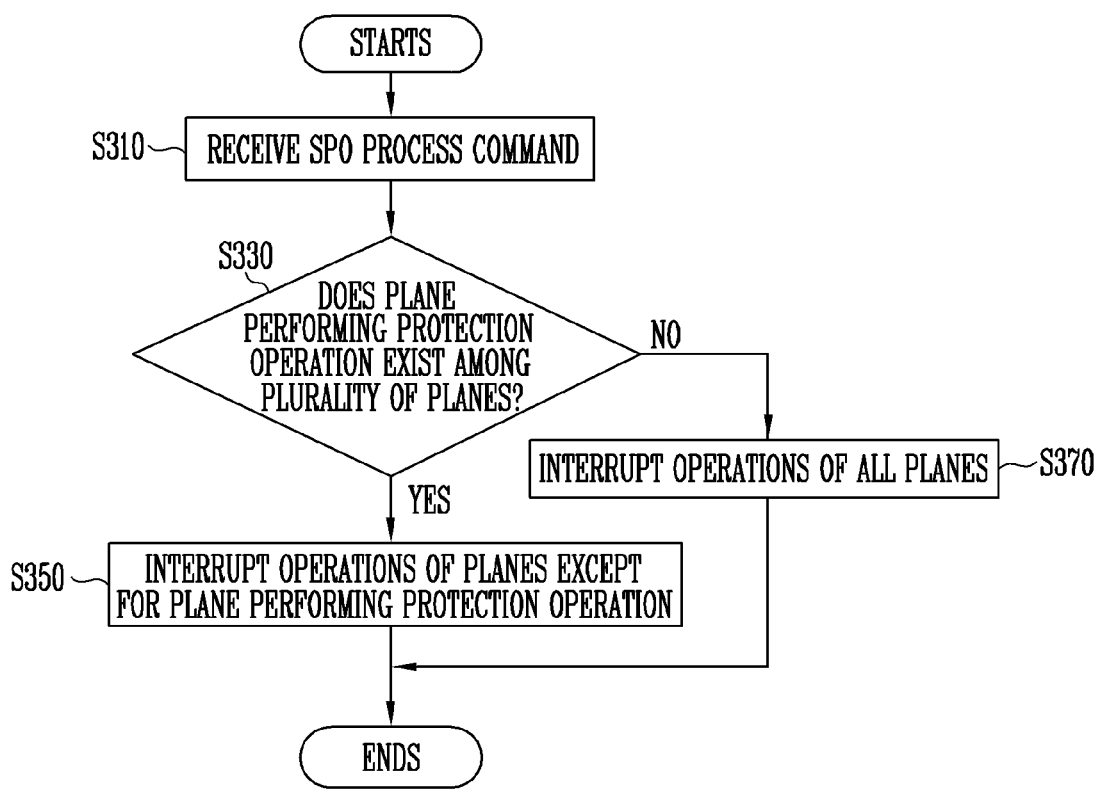
FIG. 16 is a flowchart illustrating a method of operating the semiconductor memory device 1100 according to another embodiment of the present disclosure.

FIG. 16 is a flowchart illustrating a method of operating the semiconductor memory device 1100 according to another embodiment of the present disclosure. Hereinafter, a description will be made with reference to FIGS. 14, 15A, and 15B.

According to a method of operating the semiconductor memory device 1100 according to an embodiment of the present disclosure, the command decoder 310 of the control logic 300 may receive the SPO process command $CMD_{SPO}$ (S310). The command decoder 310 may decode the received SPO process command $CMD_{SPO}$ to generate the command decoding signal CDS and transfer the generated command decoding signal CDS to the control signal generator 350 and the plane operation state storage 330. The plane operation state storage 330 may transfer the plane operation state information PSI to the control signal generator 350b in response to the received command decoding signal CDS.

The plane reset determiner 352 of the control signal generator 350b may determine whether a plane performing a protection operation exists among a plurality of planes (S330). When a plane performing a protection operation does not exist among a plurality of planes (S330: No), operations of all planes may be interrupted (S370). At step S370, the plane reset determiner 352 may generate and transfer the reset enable signal ENR to the entire plane reset controller 354. The entire plane reset controller 354 may generate the entire plane reset signal RSA for controlling all planes to be reset and may transfer the generated entire plane reset signal RSA to the first, second, third, and fourth planes P1, P2, P3, and P4. Accordingly, the operations of the first, second, third, and fourth planes P1, P2, P3, and P4 may be interrupted as described with reference to FIG. 15A.

When a plane performing a protection operation exists among the plurality of planes (S330: Yes), operations of planes except for the plane performing the protection operation may be interrupted (S350). Step S350 of FIG. 16 may be performed by steps S220, S230, S240, S250, and S260 shown in FIG. 13. Thereby, the plane reset determiner 352 may determine whether each of the first, second, third, and fourth planes P1, P2, P3, and P4 performs the protection operation in order from the first plane P1 to the fourth plane P4, and may generate the reset plane information RPI with respect to the planes performing a general operation, but not the protection operation. The individual plane reset controller 356 may generate the plane reset signal PRS for interrupting an operation of a plane performing the general operation based on the reset plane information RPI, and may transfer the generated plane reset signal PRS to the corresponding plane. According to an embodiment shown in FIG. 15B, the second and fourth plane reset signals PRS_2 and PRS_4 may be transferred to planes except for the first and third planes P1 and P3 performing the protection operation, that is, the second and fourth planes P2 and P4. Accordingly, operations of the second and fourth planes P2 and P4 may be interrupted.

Figure 17:
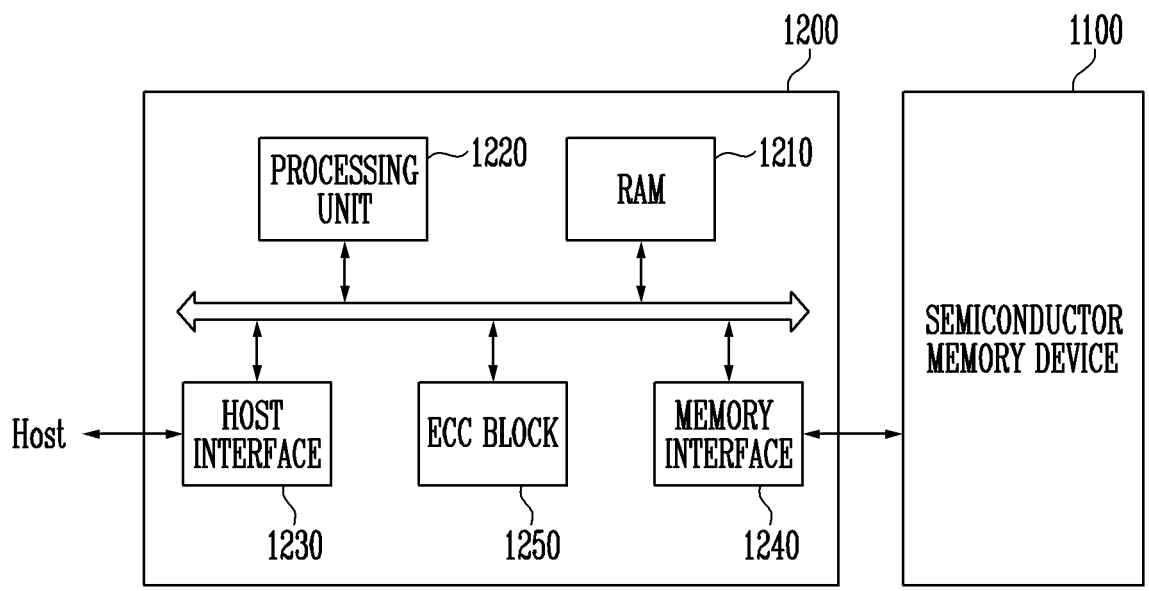
FIG. 17 is a block diagram illustrating a memory system including a semiconductor memory device shown in FIG. 3.

FIG. 17 is a block diagram illustrating a memory system including a semiconductor memory device shown in FIG. 3.

Referring to FIG. 17, the memory system 1000 may include the semiconductor memory device 1100 and the controller 1200. The semiconductor memory device 1100 may be the semiconductor memory device described with reference to FIG. 3. Hereinafter, repetitive descriptions will be omitted.

The controller 1200 may be coupled to a host Host and the semiconductor memory device 1100. The controller 1200 may be configured to access the semiconductor memory device 1100 in response to a request from the host Host. For example, the controller 1200 may be configured to control read, write, erase, and background operations of the semiconductor memory device 1100. The controller 1200 may be configured to provide an interface between the semiconductor memory device 1100 and the host Host. The controller 1200 may be configured to drive firmware for controlling the semiconductor memory device 1100.

The controller 1200 may include Random Access Memory (RAM) 1210, a processing unit 1220, a host interface 1230, a memory interface 1240, and an error correction block 1250. The RAM 1210 may serve as operational memory of the processing unit 1220, cache memory between the semiconductor memory device 1100 and the host Host, and buffer memory between the semiconductor memory device 1100 and the host Host. The processing unit 1220 may control the general operation of the controller 1200. In addition, the controller 1200 may temporarily store program data provided from the host Host during a write operation.

The host interface 1230 may include a protocol for exchanging data between the host Host and the controller 1200. For example, the controller 1200 may communicate with the host Host through one or more various interface protocols such as a Universal Serial Bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, a private protocol, and the like.

The memory interface 1240 may interface with the semiconductor memory device 1100. For example, the memory interface may include a NAND interface or a NOR interface.

The error correction block 1250 may use an Error Correcting Code (ECC) to detect and correct an error in data received from the semiconductor memory device 1100. The processing unit 1220 may adjust a read voltage according to an error detection result of the error correction block 1250 and control the semiconductor memory device 1100 to perform a re-read. According to an embodiment, the error correction block 1250 may be provided as one of the components of the controller 1200.

The controller 1200 and the semiconductor memory device 1100 may be integrated into a single semiconductor device. According to an embodiment, the controller 1200 and the semiconductor memory device 1100 may be integrated into a single semiconductor device to constitute a memory card. For example, the controller 1200 and the semiconductor memory device 1100 may be integrated into a single semiconductor device to constitute a memory card such as a PC card (personal computer memory card international association (PCMCIA)), a compact flash (CF) card, a smart media card (SM or SMC), a memory stick, a multimedia card (MMC, RS-MMC, or MMCmicro), an SD card (SD, miniSD, microSD or SDHC), or universal flash storage (UFS).

The controller 1200 and the semiconductor memory device 1100 may be integrated into a single semiconductor device to form a Solid-State Drive (SSD). The Solid-State Drive (SSD) may include a storage device configured to store data in semiconductor memory. When the memory system 1000 is used as the Solid-State Drive (SSD), an operating speed of the host Host coupled to the memory system 1000 may be significantly increased.

In another example, the memory system 1000 may be provided as one of various elements of an electronic device such as a computer, an Ultra Mobile PC (UMPC), a workstation, a net-book, a Personal Digital Assistant (PDA), a portable computer, a web tablet, a wireless phone, a mobile phone, a smartphone, an e-book, a portable multimedia player (PMP), a game console, a navigation device, a black box, a digital camera, a 3-dimensional television, a digital audio recorder, a digital audio player, a digital picture recorder, a digital picture player, a digital video recorder, a digital video player, a device capable of transmitting/receiving information in an wireless environment, one of various electronic devices for forming a home network, one of various electronic devices for forming a computer network, one of various electronic devices for forming a telematics network, an RFID device, or one of various elements for forming a computing system.

According to an embodiment, the semiconductor memory device 1100 or the memory system 1000 may be embedded in packages of various forms. For example, the semiconductor memory device 1100 or the memory system 1000 may be embedded in packages such as a package on package (PoP), ball grid arrays (BGAs), chip scale packages (CSPs), a Plastic Leaded Chip Carrier (PLCC), a Plastic Dual In Line Package (PDIP), a die in waffle pack, a die in wafer form, a Chip On Board (COB), a Ceramic Dual In Line Package (CERDIP), a Plastic Metric Quad Flat Pack (MQFP), a Thin Quad Flatpack (TQFP), a Small Outline (SOIC), a Shrink Small Outline Package (SSOP), a Thin Small Outline (TSOP), a System In Package (SIP), a Multi-Chip Package (MCP), a Wafer-level Fabricated Package (WFP), or a Wafer-level Processed Stack Package (WSP).

Figure 18:
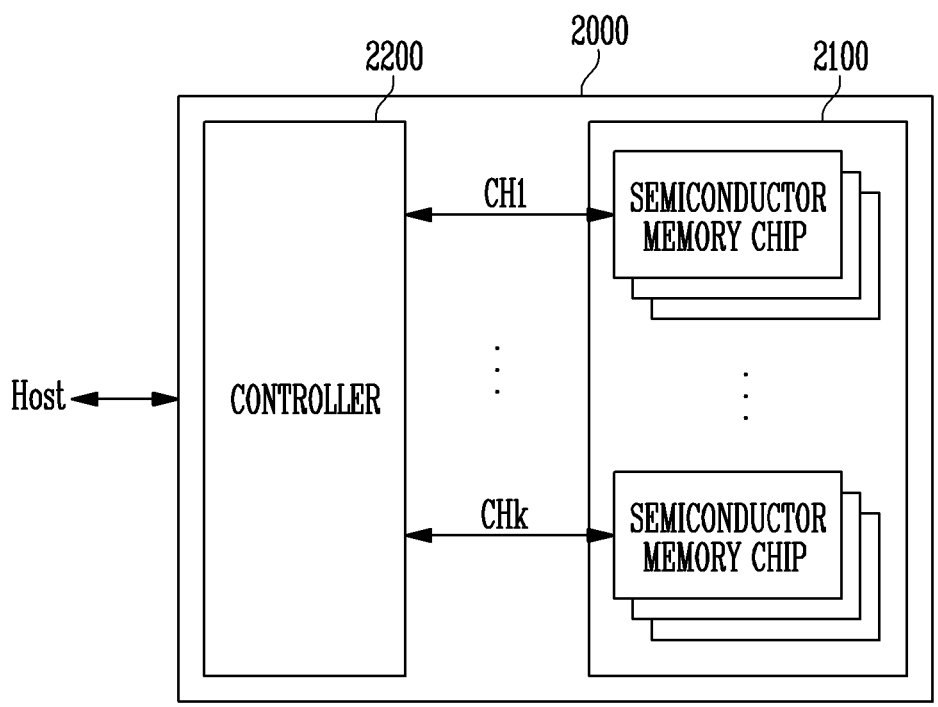
FIG. 18 is a block diagram illustrating an application example of a memory system shown in FIG. 17.

FIG. 18 is a block diagram illustrating an application example of a memory system shown in FIG. 17.

Referring to FIG. 18, a memory system 2000 may include a semiconductor memory device 2100 and a controller 2200. The semiconductor memory device 2100 may include a plurality of semiconductor memory chips. The plurality of semiconductor memory chips may be divided into a plurality of groups.

FIG. 18 illustrates that the plurality of groups may communicate with the controller 2200 through first to kth channels CH1 to CHk, respectively. Each of the semiconductor memory chips may be configured and operated in substantially the same manner as the semiconductor memory device 1100 described above with reference to FIG. 3.

Each group may be configured to communicate with the controller 2200 through a single common channel. The controller 2200 may be configured in substantially the same manner as the controller 1200 described with reference to FIG. 17, and configured to control the plurality of memory chips of the semiconductor memory device 2100 through the plurality of first to kth channels CH1 to CHk.

Figure 19:
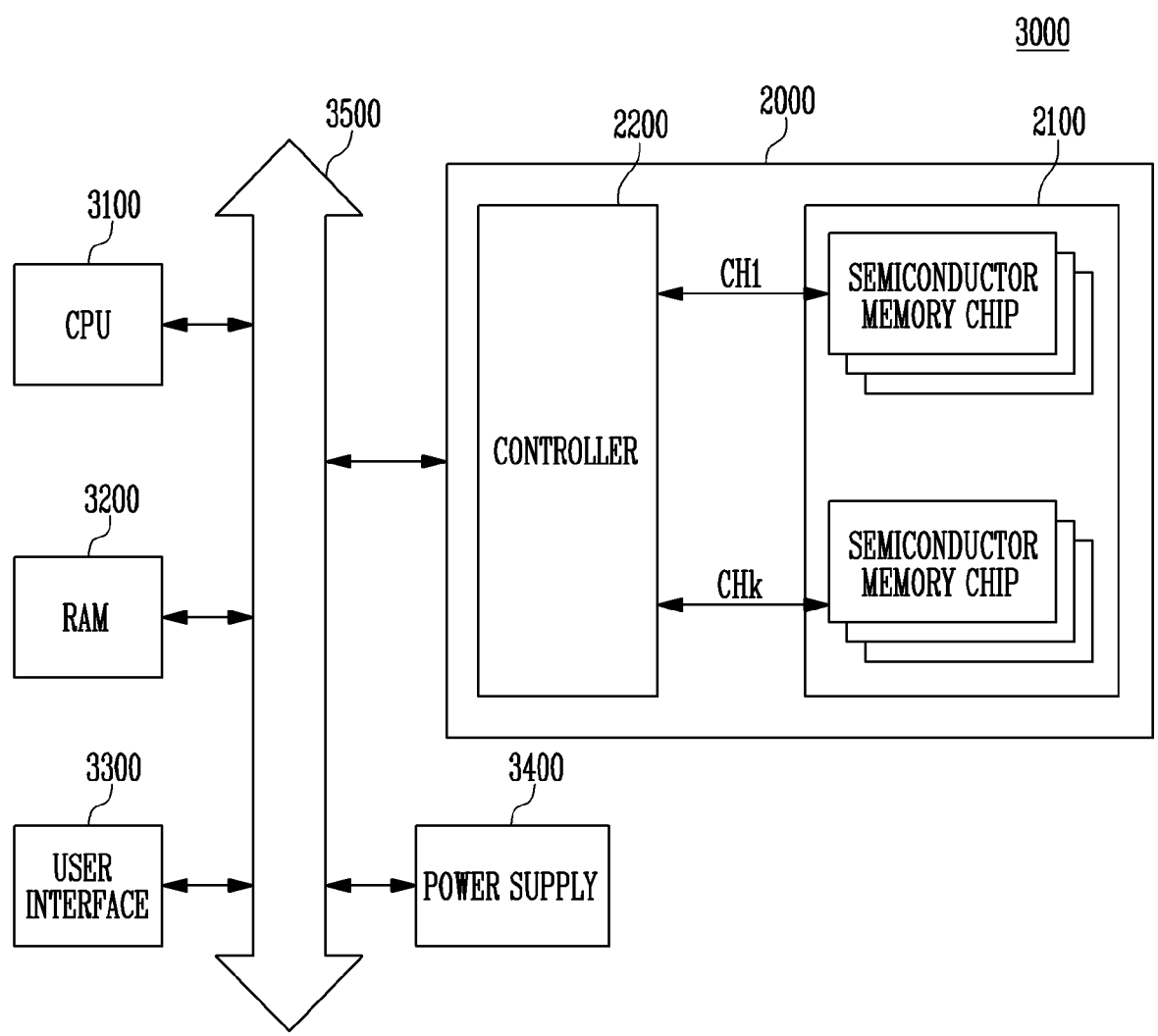
FIG. 19 is a block diagram illustrating a computing system including a memory system described with reference to FIG. 18.

FIG. 19 is a block diagram illustrating a computing system including the memory system described with reference to FIG. 18.

The computing system 3000 may include a central processing unit 3100, Random Access Memory (RAM) 3200, a user interface 3300, a power supply 3400, a system bus 3500, and the memory system 2000.

The memory system 2000 may be electrically coupled to the central processing unit 3100, the RAM 3200, the user interface 3300, and the power supply 3400 through the system bus 3500. Data provided through the user interface 3300 or data processed by the central processing unit 3100 may be stored in the memory system 2000.

FIG. 19 illustrates that the semiconductor memory device 2100 is coupled to the system bus 3500 through the controller 2200. However, the semiconductor memory device 2100 may be directly coupled to the system bus 3500. The functions of the controller 2200 may be performed by the central processing unit 3100 and the RAM 3200.

Referring to FIG. 19, it is illustrated that the memory system 2000 described with reference to FIG. 18 is provided. However, the memory system 2000 may be replaced with the memory system 1000 described with reference to FIG. 17. As an example of an embodiment, the computing system 3000 may include both of the memory systems 1000 and 2000 described above with reference to FIGS. 17 and 18.

According to embodiments of the present disclosure, stability of a semiconductor memory device, a controller, and a memory system having the semiconductor memory device and the controller may be improved.

Embodiments disclosed in the present specification and the accompanying drawings have been provided to help those with ordinary knowledge in this art more clearly understand the present disclosure rather than to limit the bounds of the present disclosure. It will be apparent to those skilled in the art that various modifications can be made to the above-described embodiments of the present disclosure without departing from the spirit or scope of the present disclosure. Thus, it is intended that the present disclosure cover all such modifications provided the modifications come within the scope of the appended claims and their equivalents.

What is claimed is:

1. A memory system, comprising:
a semiconductor memory device including a plurality of planes, the semiconductor memory device being configured to perform a protection operation and a general operation on the plurality of planes included in the semiconductor memory device; and
a controller for the semiconductor memory device in communication with a host and configured to control an operation of the semiconductor memory device by transferring a Sudden Power Off (SPO) process command, which is generated in response to a Sudden Power Off (SPO) that occurs in the memory system, to the semiconductor memory device,
wherein the semiconductor memory device is configured to interrupt the general operation among operations performed on the plurality of planes in response to receiving the SPO process command by selecting a plane from the plurality of planes, determining a type of operation being performed by the selected plane, and determining based on the type of operation being performed by the selected plane whether or not to interrupt the operation being performed by the selected plane at a time of the SPO process command.

2. The memory system of claim 1, wherein the protection operation includes a program operation.

3. The memory system of claim 1, wherein the general operation includes one of an erase operation and a read operation.

4. The memory system of claim 1, wherein the semiconductor memory device interrupts the general operation by identifying a plane performing the general operation among the plurality of planes in response to the SPO process command and generates an internal control signal for interrupting an operation of the identified plane.

5. A semiconductor memory device operating by control of a controller in communication with a host, the semiconductor memory device comprising:
a plurality of planes;
a plurality of row decoders coupled to the plurality of planes through row lines;
a plurality of page buffer groups coupled to the plurality of planes through bit lines; and
a control logic controlling the plurality of row decoders and the plurality of page buffer groups to perform a protection operation and a general operation on the plurality of planes,
wherein the control logic is configured to control the plurality of row decoders and the plurality of page buffer groups to interrupt the general operation among operations performed on the plurality of planes included in the semiconductor memory device in response to a Sudden Power Off (SPO) process command received from the controller, and
wherein the semiconductor memory device further comprises at least one individual plane reset controller of the semiconductor memory device which determines whether or not to interrupt an operation of a selected plane based on a type of operation performed by the selected plane at a time of the SPO process command.

6. The semiconductor memory device of claim 5, wherein the control logic comprises circuitry, the circuitry comprising:
a command decoder configured to decode the SPO process command and generate a command decoding signal which indicates that an operation on a plane performing the general operation should be interrupted;
plane operation state storage configured to store a current operation state of each of the plurality of planes; and
a control signal generator configured to identify a plane which performs the general operation based on the current operation state of each of the plurality of planes and the command decoding signal, and to generate an internal control signal for interrupting an operation of the identified plane.

7. The semiconductor memory device of claim 6, wherein the control signal generator comprises:
a plane reset determiner configured to generate identification information for the plane which performs the general operation by receiving information indicating the current operation state of each of the plurality of planes; and
an individual plane reset controller configured to generate the internal control signal for interrupting the operation of the identified plane based on the identification information for the plane which performs the general operation.

8. The semiconductor memory device of claim 6, wherein the control signal generator comprises:
a plane reset determiner configured to generate a reset enable signal if a plane which performs the protection operation does not exist among the plurality of planes and to generate identification information of the plane which performs the general operation if a plane which performs the protection operation exists among the plurality of planes, by receiving information indicating the current operation state for each of the plurality of planes;
an entire plane reset controller configured to generate a first control signal for interrupting all operations of the plurality of planes in response to the reset enable signal; and
an individual plane reset controller configured to generate a second control signal for interrupting the operation of the identified plane based on the identification information of the plane which performs the general operation.

9. A method of operating a controller in communication with a host and which controls an operation of a semiconductor memory device including a plurality of planes, the method comprising:

sensing a sudden power off (SPO) in a memory system including the semiconductor memory device and the controller;

sensing an operation state of the semiconductor memory device; and generating and transferring an SPO process command, which indicates that the SPO occurred, to the semiconductor memory device based on the operation state, wherein, in response to receiving the SPO process command, the semiconductor memory device selectively interrupts operations of the plurality of planes included in the semiconductor memory device based on a type of the operations by determining with an individual plane reset controller of the semiconductor memory device whether or not to interrupt an operation of a selected plane.

10. The method of claim 9, wherein, the generating and transferring is performed in response to the semiconductor memory device being in a busy state.

11. A method of operating a semiconductor memory device which performs a general operation and a protection operation on a plurality of planes included in the semiconductor memory device, the method comprising:

receiving a sudden power off (SPO) process command from a controller in communication with a host;

selecting one of the plurality of planes included in the semiconductor memory device; and determining with an individual plane reset controller of the semiconductor memory device whether or not to interrupt an operation of the selected plane in response to receiving the SPO process command based on an operation state of the selected plane and based on a type of the operation performed by the selected plane.

12. The method of claim 11, wherein the determining comprises:

detecting the protection operation performed by the selected plane; and determining not to interrupt the protection operation of the selected plane.

13. The method of claim 11, wherein the determining comprises:

detecting the general operation performed by the selected plane; and determining to interrupt the general operation of the selected plane.

14. The method of claim 13, further comprising generating an internal control signal for interrupting the general operation of the selected plane.

15. The method of claim 11, wherein the protection operation includes a program operation.

16. The method of claim 11, wherein the general operation includes one of an erase operation and a read operation.

17. A method of operating a semiconductor memory device which performs a general operation and a protection operation on a plurality of planes included in the semiconductor memory device, the method comprising:

receiving a sudden power off (SPO) process command from a controller in communication with a host;

determining whether a plane which performs the protection operation exists among the plurality of planes included in the semiconductor memory device; and interrupting with an individual plane reset controller of the semiconductor memory device an operation of a selected plane among the plurality of planes in response to receiving the SPO process command based on a determination result and based on a type of the operation performed by the selected plane.

18. The method of claim 17, wherein, the interrupting includes interrupting all operations of the plurality of planes in response to the plurality of planes performing the general operation.

19. The method of claim 17, wherein, when the plane which performs the protection operation is determined to exist among the plurality of planes, the interrupting comprises:

determining whether to interrupt an operation of the selected plane based on an operation state of the selected plane.

20. The method of claim 19, wherein the determining whether to interrupt the operation of the selected plane based on the operation state of the selected plane comprises:

detecting the protection operation performed by the selected plane; and determining not to interrupt the protection operation of the selected plane.

21. The method of claim 19, wherein the determining whether to interrupt the operation of the selected plane based on the operation state of the selected plane comprises:

detecting the general operation performed by the selected plane; and determining to interrupt the general operation of the selected plane.

22. The method of claim 21, further comprising generating an internal control signal for interrupting the general operation of the selected plane.

23. The method of claim 17, wherein the protection operation includes a program operation.

24. The method of claim 17, wherein the general operation includes one of an erase operation and a read operation.

* * * * *